US011348335B2

(12) United States Patent
Konstantakopoulos et al.

(10) Patent No.: US 11,348,335 B2
(45) Date of Patent: May 31, 2022

(54) COMPUTER IMPLEMENTED STRUCTURAL THERMAL AUDIT SYSTEMS AND METHODS

(71) Applicant: EFFICIENCY MATRIX PTY LTD, Melbourne (AU)

(72) Inventors: John Konstantakopoulos, Melbourne (AU); Chun Cheung, Melbourne (AU)

(73) Assignee: EFFICIENCY MATRIX PTY LTD, Melbourne (AU)

( * ) Notice: Subject to any disclaimer, the term of this patent is extended or adjusted under 35 U.S.C. 154(b) by 0 days.

(21) Appl. No.: 17/062,914

(22) Filed: Oct. 5, 2020

(65) Prior Publication Data

US 2021/0034875 A1 Feb. 4, 2021

Related U.S. Application Data

(63) Continuation of application No. PCT/AU2019/050307, filed on Apr. 5, 2019.

(30) Foreign Application Priority Data

Apr. 5, 2018 (AU) ................................ 2018901134

(51) Int. Cl.
*G06V 20/20* (2022.01)
*G01C 3/02* (2006.01)
(Continued)

(52) U.S. Cl.
CPC ............... *G06V 20/20* (2022.01); *G01C 3/02* (2013.01); *G01J 5/00* (2013.01); *H04N 5/232* (2013.01);
(Continued)

(58) Field of Classification Search
None
See application file for complete search history.

(56) References Cited

U.S. PATENT DOCUMENTS 4,679,068 A * 7/1987 Lillquist ................ H04N 5/332
250/332
4,751,571 A * 6/1988 Lillquist ................... G01J 5/48
250/330
(Continued)

FOREIGN PATENT DOCUMENTS

JP 2015526692 A * 9/2015
WO WO-2013056188 A1 * 4/2013 ............. G06T 17/20
(Continued)

OTHER PUBLICATIONS

International Search Report, International Application No. PCT/AU2019/050307 dated Jun. 13, 2019.
(Continued)

*Primary Examiner* — Stefan Gadomski
(74) *Attorney, Agent, or Firm* — Richard A. Fagin

(57) ABSTRACT

In one preferred form of the present invention, there is provided a computer implemented thermal audit method (58) including: using items (64) of photograph data (66), each item (64) of photograph data (66) being of a structure from a viewpoint where the item of photograph data (66) is based on the visual spectrum as would be seen by the human eye; using items (74) of thermal image data (76), each item (74) of thermal data (76) being of the structure from a viewpoint where the item (74) of thermal image data (76) is based on the thermal spectrum as would be seen by a thermal imaging camera; and applying a computer algorithm that identifies thermal points of interest (82) in connection with the thermal image data (66) and combines the thermal areas of interest (82) with the photograph data (66).

20 Claims, 26 Drawing Sheets

(51) Int. Cl.
  *G01J 5/00*    (2022.01)
  *H04N 5/232*   (2006.01)
  *G01J 5/48*    (2022.01)
(52) U.S. Cl.
  CPC ......... *G01J 5/48* (2013.01); *G01J 2005/0077* (2013.01)

(56) References Cited

U.S. PATENT DOCUMENTS

| | | | |
|---|---|---|---|
| 8,186,873 | B1 | 5/2012 | Madding |
| 8,374,438 | B1* | 2/2013 | Wagner .................. G06T 7/001 |
| | | | 382/209 |
| 8,531,562 | B2 | 9/2013 | Schmidt et al. |
| 8,755,597 | B1* | 6/2014 | Tantalo ................ G06K 9/2018 |
| | | | 382/162 |
| 8,791,960 | B2 | 7/2014 | Yoon et al. |
| 9,269,022 | B2 | 2/2016 | Rhoades et al. |
| 9,285,296 | B2 | 3/2016 | Georgeson et al. |
| 9,589,372 | B1 | 3/2017 | Bean et al. |
| 9,741,170 | B2 | 8/2017 | Park et al. |
| 9,924,160 | B1* | 3/2018 | Kresch ...................... G06T 7/80 |
| 2006/0249679 | A1* | 11/2006 | Johnson ................ G01J 5/0295 |
| | | | 250/332 |
| 2007/0087311 | A1 | 4/2007 | Garvey, III et al. |
| 2008/0099678 | A1* | 5/2008 | Johnson ................ G01J 5/0265 |
| | | | 250/332 |
| 2008/0265162 | A1 | 10/2008 | Hamrelius et al. |
| 2010/0045809 | A1* | 2/2010 | Packard .................. G06T 7/136 |
| | | | 348/222.1 |
| 2011/0090343 | A1* | 4/2011 | Alt ........................ G06T 19/006 |
| | | | 348/164 |
| 2011/0118608 | A1* | 5/2011 | Lindner ................ G01J 5/0025 |
| | | | 600/474 |
| 2014/0240512 | A1* | 8/2014 | Hogasten ................. G06K 9/40 |
| | | | 348/164 |
| 2015/0187144 | A1* | 7/2015 | Roth ...................... G06T 19/006 |
| | | | 345/633 |
| 2015/0334315 | A1* | 11/2015 | Teich ........................ G06T 5/20 |
| | | | 348/164 |
| 2016/0093034 | A1* | 3/2016 | Beck ..................... G06T 3/4061 |
| | | | 345/617 |
| 2017/0104930 | A1* | 4/2017 | Rozploch .............. H04N 5/2258 |
| 2017/0236022 | A1* | 8/2017 | Abbas .................... A61B 90/36 |
| | | | 348/77 |
| 2017/0287190 | A1 | 10/2017 | Lin et al. |
| 2017/0374296 | A1* | 12/2017 | Schmidt .................. G06T 7/001 |
| 2018/0039061 | A1* | 2/2018 | Hairston ................ G02B 23/04 |
| 2018/0052057 | A1* | 2/2018 | Richards ................ G01J 5/025 |
| 2018/0054573 | A1* | 2/2018 | Handley ............... G01J 5/0859 |
| 2018/0224652 | A1* | 8/2018 | Havens ..................... G02B 9/60 |
| 2019/0051054 | A1 | 2/2019 | Jovanovic et al. |

FOREIGN PATENT DOCUMENTS

| | | | | |
|---|---|---|---|---|
| WO | WO-2016160930 | A1 * | 10/2016 | ............. G06T 7/521 |
| WO | WO-2017159312 | A1 * | 9/2017 | ......... H04N 5/23232 |

OTHER PUBLICATIONS

Written Opinion of the International Search Authority, International Application No. PCT/AU2019/050307 dated Jun. 13, 2019.
Wikipedia entry on SLAM, at the URL https://en.wikipedia.org/wiki/Simultaneous_localization_and_mapping, downloaded on Dec. 6, 2021.
Aleksander Holynski and Johannes Kopf, ACM Transactions on Graphics (Proc. SIGGRAPH Asia), vol. 37, 6, 2018 Fast Depth Densification for Occlusion-Aware Augmented Reality, available at the URL https://homes.cs.washington.edu/~holynski/publications/occlusion/index.html, Abstract downloaded on Dec. 6, 2021.

* cited by examiner

Visual Image

Edge Transform

Thermal Image

Edge Transform

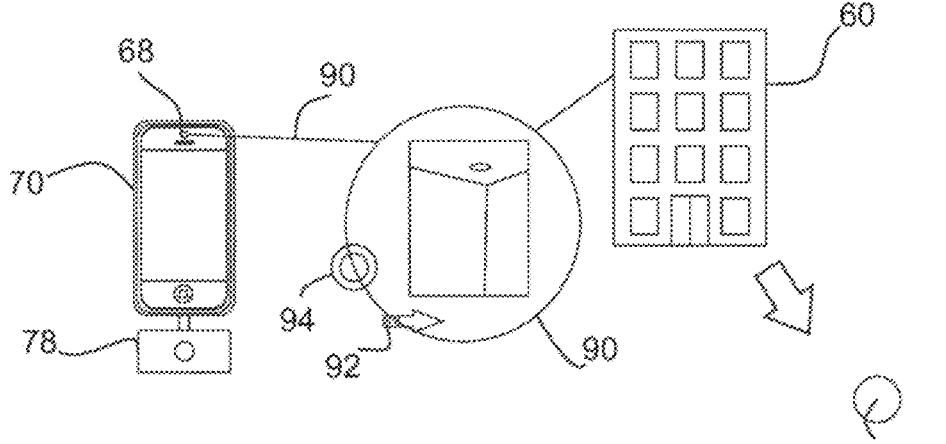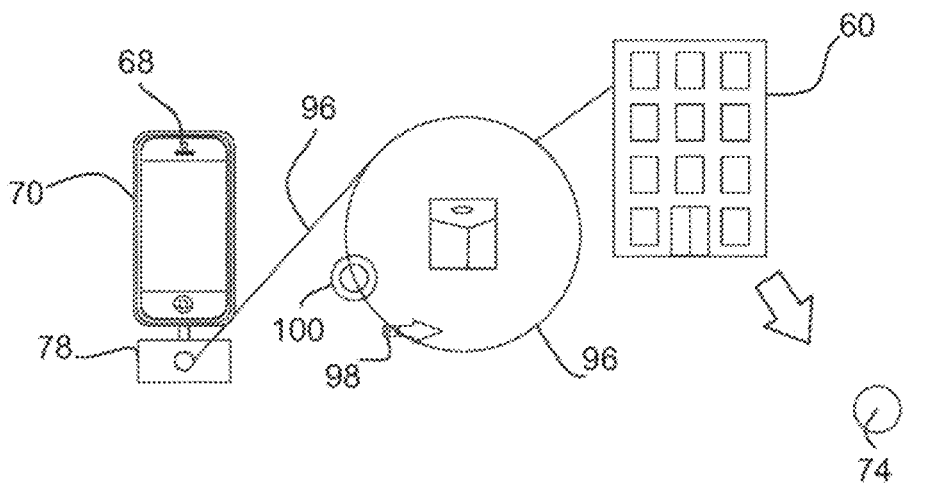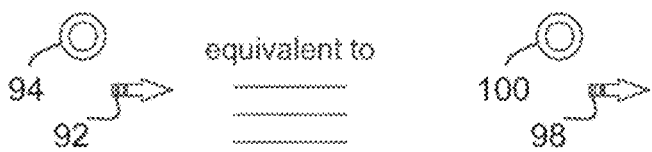
Fig. 9

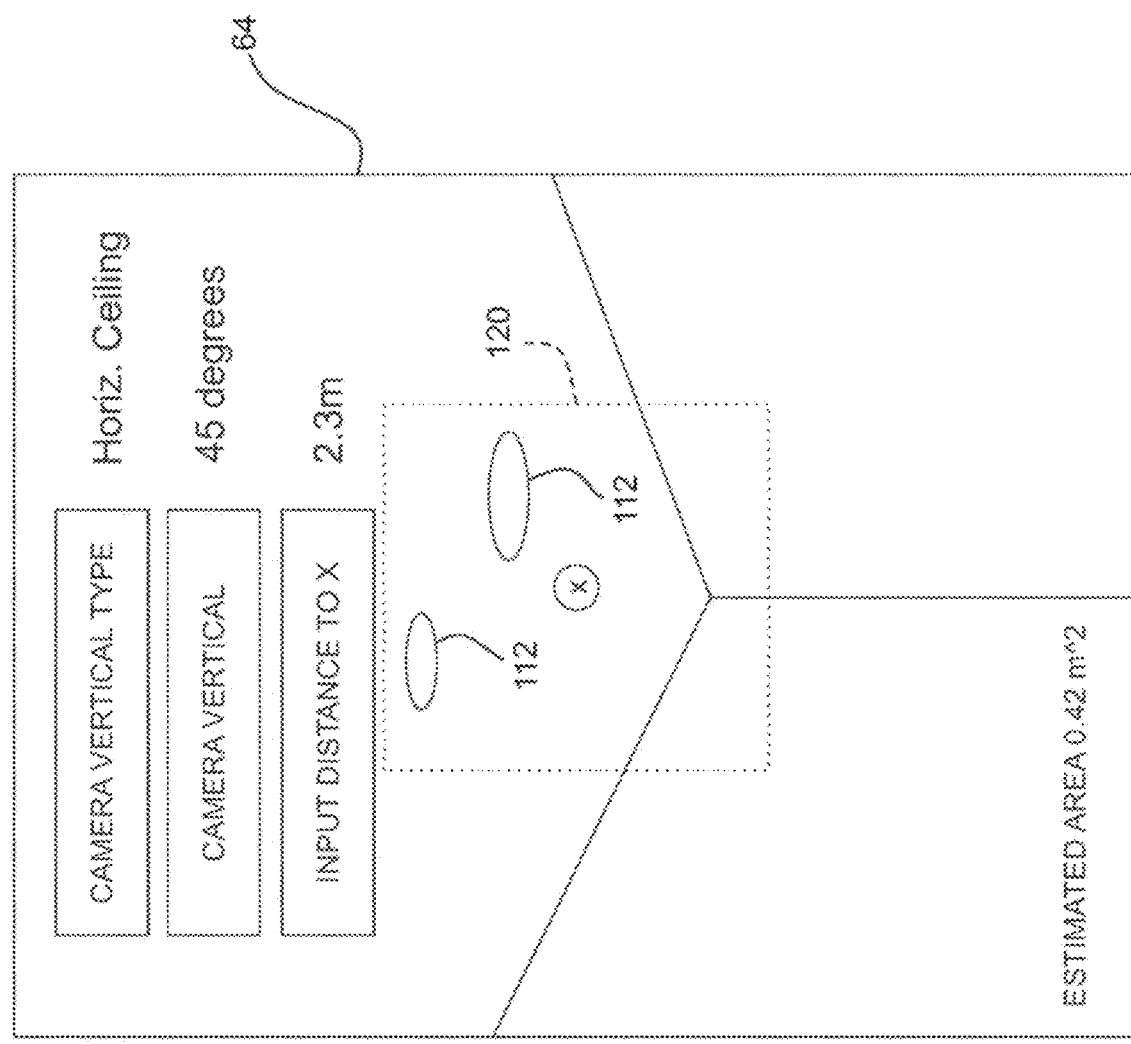
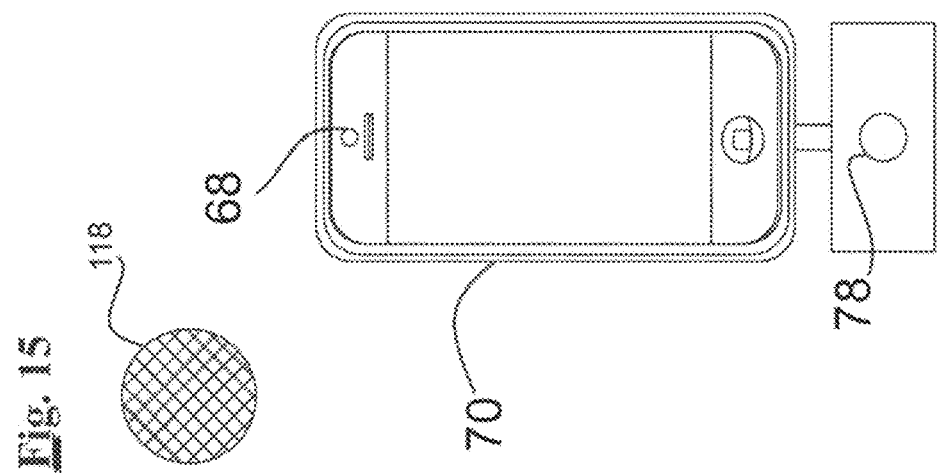
Fig. 15

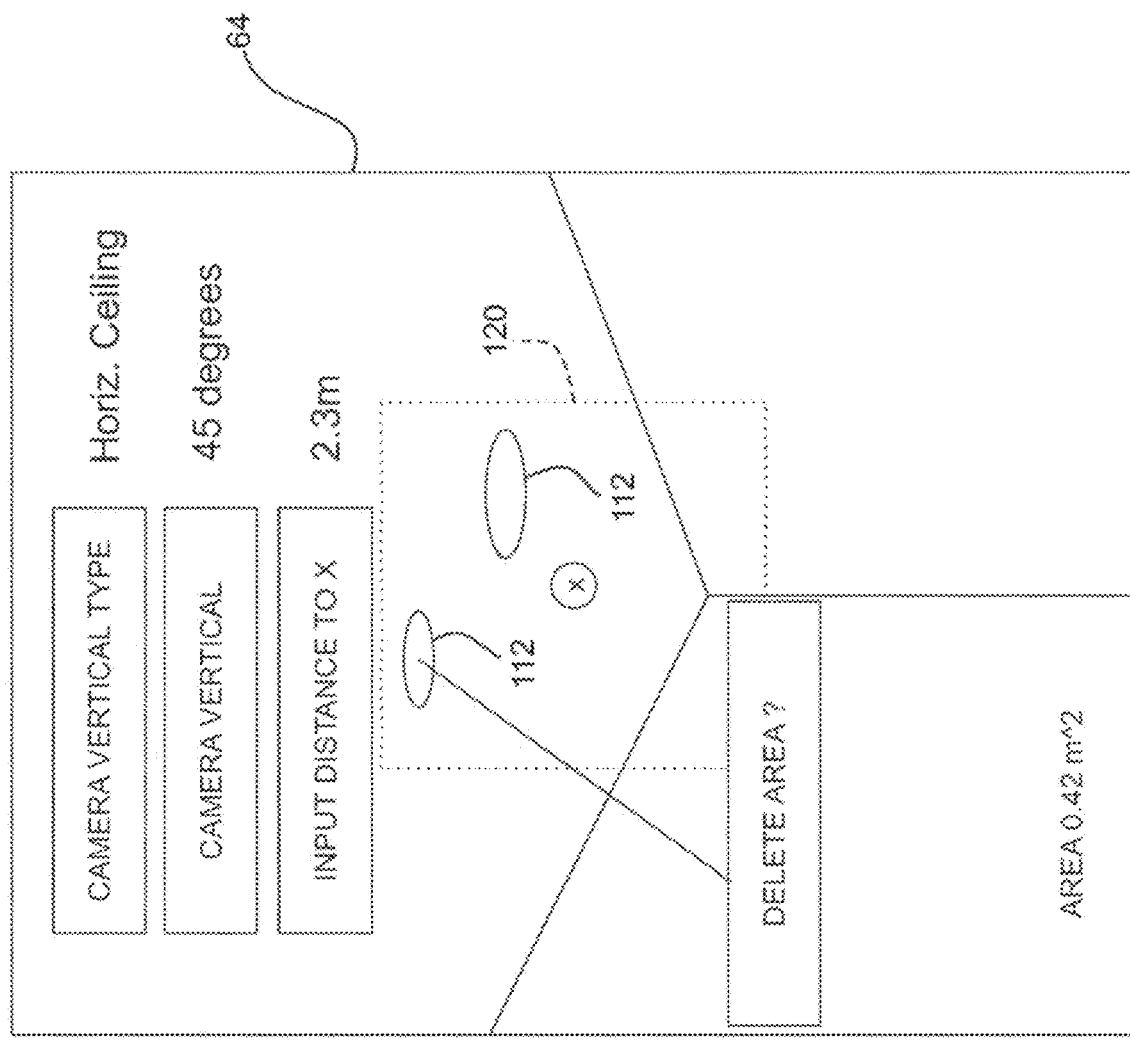
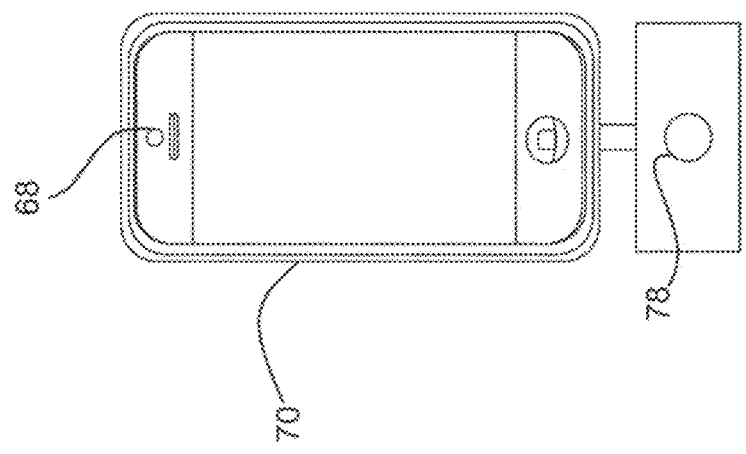
Fig. 16

Step One

COMPUTER IMPLEMENTED STRUCTURAL THERMAL AUDIT SYSTEMS AND METHODS

CROSS REFERENCE TO RELATED APPLICATIONS

Continuation of International Application No. PCT/AU2019/050307 filed on Apr. 5, 2019. Priority is claimed from Australian provisional application 2018901134 filed on Apr. 5, 2018. All parts and elements of the foregoing applications are hereby fully incorporated by reference for all purposes.

FIELD OF THE INVENTION

The present invention relates to structural computer implemented thermal audit systems and methods. More particularly the present invention relates to the thermal auditing of buildings and other structures.

A number of thermal audit systems and methods are disclosed. These systems and methods may be referred to as structural thermal audit systems and methods in the sense that they are directed to buildings, enclosures and other structures.

BACKGROUND TO THE INVENTION

Thermal audit systems and methods are applied in the auditing of structures including commercial buildings, residential buildings and other enclosures.

Thermal audits are generally conducted for the purpose of improving building performance including thermal efficiency and building longevity. Recommendations provided as a result of a thermal audit may include insulation application, thermal bridging reduction, draught proofing and glazing.

Methods of determining building performance include thermal imaging and air leakage testing. Generally, an assessor will provide a final report together with approaches for reducing heating and cooling energy while keeping the facility at a desirable comfort level.

Building performance extends to thermal air tightness as well as thermal insulation efficiency and consistency. Air tightness, thermal efficiency and thermal consistency all form part of building performance.

It is against this background and the problems and difficulties associated therewith that the inventor has developed the present invention.

SUMMARY OF THE INVENTION

According to a first aspect of preferred embodiments herein described there is provided a computer implemented thermal audit system comprising a facility for determining extent information with respect to thermal image data. Preferably the extent information comprises distance information. Preferably the system includes a receiver for receiving thermal image data and visual image data; with the facility being provided as a combiner for combining the thermal image data with the visual image data to provide distance information in relation to the thermal image data.

Preferably the facility contains an edge matcher for matching edges of the thermal image data with edges of the visual image data.

Preferably the edge matcher includes an edge detector.

According to an aspect of preferred embodiments herein described there is provided a computer implemented thermal audit method including determining extent information with respect to thermal image data. Preferably the extent information comprises distance information. Preferably the method includes receiving thermal image data and visual image data; and combining the thermal image data with the visual image data to provide distance information in relation to the thermal image data.

Preferably the method includes matching edges of the thermal image data with edges of the visual image data.

Preferably the method includes using an edge detector.

According to an aspect of preferred embodiments herein described there is provided a computer implemented thermal audit method including:

using items of photograph data, each item of photograph data being of a structure from a viewpoint where the item of photograph data is based on the visual spectrum as would be seen by the human eye;

using items of thermal image data, each item of thermal data being of the structure from a viewpoint where the item of thermal image data is based on the thermal spectrum as would be seen by a thermal imaging camera; and applying a computer algorithm that identifies thermal areas of interest in connection with the thermal image data and combines the thermal areas of interest with the photograph data.

Preferably the method comprises a structural thermal audit method by being directed to buildings, enclosures and other structures.

It is to be appreciated that the thermal areas are points of interest in the sense of being of interest to an assessor.

Preferably the method includes generating associated pairs of photograph data items and thermal image data items by repeatedly: (a) collecting an item of photograph data from a first viewpoint using a camera; and collecting an item of thermal image data from a second viewpoint using a thermal imaging device wherein the first viewpoint and the second viewpoint have substantially the same direction and base location; and (b) changing the first viewpoint.

Preferably the method includes synchronising the camera and thermal imaging device to assist with ensuring that the first viewpoint and the second viewpoint of each pair have substantially the same direction and base location.

Preferably synchronising the camera and thermal imaging device includes ensuring that the item of photograph data of a pair is collected within less than 1 or 2 seconds before or after the item of thermal image data of the pair is collected.

Preferably combining the thermal areas of interest, in connection with the thermal image data, with the photograph data includes overlaying the thermal areas of interest on the photograph data to highlight and represent the thermal areas of interest in relation to the photograph data.

Preferably combining the areas of interest with the photograph data is performed only where the thermal image data associated with the areas of interest is within a temperature range.

Preferably the method includes estimating the total surface area of the areas of interest.

Preferably estimating the total surface area includes using position data associated with the photograph data or thermal data.

Preferably the position data includes direction data associated with the photograph data or thermal data.

Preferably the position data includes distance data associated with the photograph data or thermal data.

According to another aspect of preferred embodiments herein described there is provided a computer implemented thermal audit system including:

a store for containing items of photograph data and items of thermal image data, each item of photograph data being of a structure from a viewpoint where the item of photograph data is based on the visual spectrum as would be seen by the human eye, each item of thermal image data being of a structure from a viewpoint where the item of thermal image data is based on the thermal spectrum as would be seen by a thermal imaging camera; and a combiner for utilising a computer algorithm that identifies thermal areas of interest in connection with the thermal image data and combines the areas of interest with the photograph data.

Preferably the system comprises a structural thermal audit system by being directed to buildings and other structures.

Preferably the system includes a controller for generating associated pairs of the photograph data and thermal image data by controlling a camera to collect an item of the photograph data from a first viewpoint and for controlling a thermal imaging device to collect an item of thermal image data from a second viewpoint wherein the first viewpoint and the second viewpoint have substantially the same direction and base location.

Preferably the controller includes a synchroniser for synchronising the camera and the thermal imaging device to assist with ensuring that the first viewpoint and the second viewpoint of a pair have the same direction and base location.

Preferably the synchroniser is configured to synchronise the camera and thermal imaging device to ensure that the photograph data of a pair is collected within less than 1 or 2 seconds before or after the thermal image data of the pair is collected.

Preferably the combiner includes an over-layer for over-laying the thermal areas of interest on the photograph data to highlight and represent the thermal areas of interest in relation to the photograph data.

Preferably the system includes a range limiter for specifying a temperature range; the combiner being configured to combine the areas of interest with the photograph data only where the thermal image data associated with the thermal areas of interest is within the temperature range specified by the range limiter.

Preferably the system includes an estimator configured to estimate the total surface area of the areas of interest.

Preferably the estimator is configured to estimate the total surface area using position data associated with the photograph data or thermal data.

Preferably the estimator is configured to estimate the total surface area with the position data including direction data associated with the photograph data or thermal data.

Preferably the estimator is configured to estimate the total surface area with the position data including direction distance data associated with the photograph data or thermal data.

Preferably the system includes a delete tool for deleting thermal areas of interest.

Preferably the delete tool allows a thermal area spanning more than a single wall, ceiling or floor to be modified so as to be assignable to one of a wall, ceiling or floor.

According to another aspect of preferred embodiments herein described there is provided a computer implemented method comprising making at least three distance measurements using distance detector arrangement, with each measurement having a fixed angular separation with respect to the other measurements; determining distances on a photograph or thermal image; and estimating thermal surface areas from the thermal image.

According to another aspect of preferred embodiments herein described there is provided a computer implemented system comprising a distance detector arrangement for making at least three distance measurements, with each measurement having a fixed angular separation with respect to the other measurements; a calculator for determining distances on a photograph or thermal image; and an estimator for estimating thermal surface areas from the thermal image.

According to another aspect of preferred embodiments herein described there is provided a device having: a projection arrangement for projecting an image onto a surface and determining at least three distances to the projected image.

Preferably the distances are from the projection arrangement to different locations corresponding with different angles of projection.

Preferably the projection arrangement includes a measurement system for taking at least three measurements relative to the image.

Preferably the measurements are distance measurements.

Preferably the projection arrangement includes three laser devices each configured to send respective laser beams; each laser device having a measurement system for measuring the distance to the point at which the laser beam of the laser device contacts the surface.

Preferably the device includes a camera for recording the projected image on the surface.

Preferably the camera comprises a visual spectrum camera.

Preferably the camera comprises a thermal spectrum camera and the projection arrangement is configured to heat the surface to an extent necessary to allow a thermal spectrum camera to record the projected image on the surface.

Preferably the projection arrangement projects at least three points onto the surface and is configured to measure the distance to each point; each point being projected in a predetermined manner to allow estimation of inclination and position of the surface relative to the projection arrangement.

Preferably the projection arrangement includes a thermal spectrum camera.

Preferably the projection arrangement includes a visual spectrum camera.

According to another aspect of preferred embodiments herein described there is provided a computer implemented system comprising: a projection arrangement for projecting an image onto a surface; a camera for recording the projected image on the surface; and a measurement system for taking at least three measurements relative to the projected image.

Preferably the measurements are distance measurements.

Preferably the different locations correspond with different angles of projection.

Preferably the distance measurements are from the projection arrangement to different locations corresponding with different angles of projection.

Preferably the system includes a display facility for providing grids determined using the measurements.

According to another aspect of preferred embodiments herein described there is provided a computer implemented method comprising: projecting an image onto a surface;

recording the projected image on the surface and taking at least three measurements relative to the projected image.

Preferably the measurements are distance measurements.

Preferably the different locations correspond with different angles of projection.

Preferably the distance measurements are from a projection arrangement to different locations corresponding with different angles of projection.

According to another aspect of preferred embodiments herein described there is provided a method of combining two dimensional thermal data and visual spectrum data, based on a thermal threshold, and accounting for matters of perspective when estimating the effective surface area of the thermal data.

According to another aspect of preferred embodiments herein described there is provided a system comprising a combiner for combining two dimensional thermal data and visual spectrum data, based on a thermal threshold, and an estimator for accounting for matters of perspective and estimating the effective surface area of the thermal data.

It is to be recognised that other aspects, preferred forms and advantages of the present invention will be apparent from the present specification including the detailed description, drawings and claims.

Further advantages and preferred features will be apparent from the drawings and a reading of the specification as a whole.

BRIEF DESCRIPTION OF DRAWINGS

In order to facilitate a better understanding of the present invention, several preferred embodiments will now be described with reference to the accompanying drawings, in which:

FIGS. 7 to 10 provide a schematic view of a computer implemented thermal audit method according to another preferred embodiment of the present invention.

FIGS. 12 to 16 provide further schematic views of the embodiment shown in FIGS. 7 to 11.

DETAILED DESCRIPTION OF THE EMBODIMENTS

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

A number of thermal audit systems and methods are disclosed. These systems and methods may be referred to as structural thermal audit systems and methods in the sense that they are directed to buildings and other structures.

Figure 1:
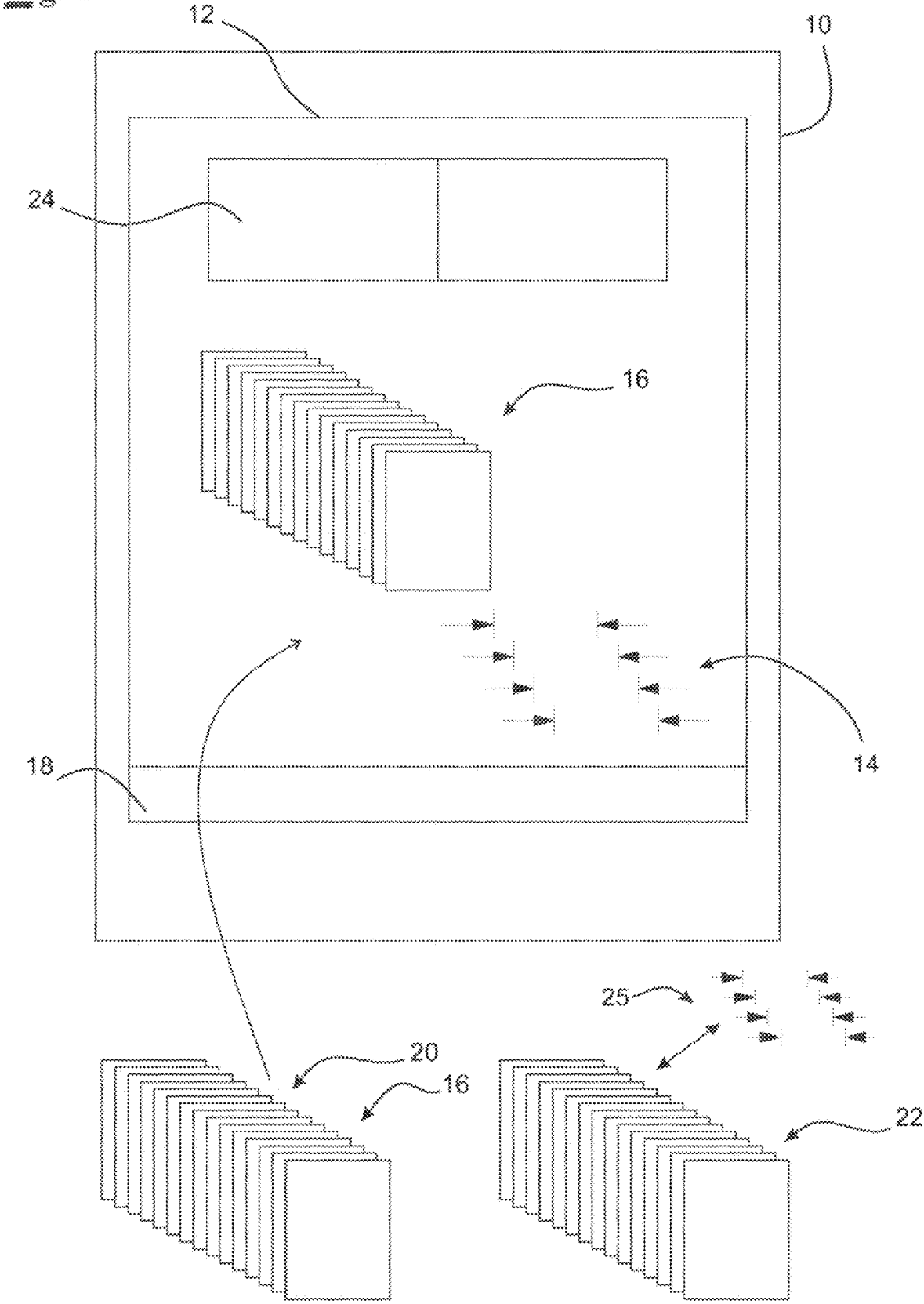
FIG. 1 provides a schematic view of a computer implemented thermal audit system according to a first preferred embodiment of the present invention.

Referring to FIG. 1 there is shown a computer implemented thermal audit system 10 according to a first preferred embodiment of the present invention. The thermal audit system 10 includes a facility 12 for determining distance information 14 from thermal image data 16.

The system 10 includes a receiver 18 for receiving thermal image data 20 and visual image data 22 The facility 12 is provided as combiner 12 for combining the thermal image data 20 with the visual image data 22 data to provide the extent information 14 in relation to the thermal image data 16. The thermal image data 20 provides the thermal data 16. The visual data 22 is of a high resolution and taken with a device having an augmented reality associating the visual data with distance information. In this regard the thermal image data 20 comprises a number of thermal spectrum images of a room in a building (a scene) and the visual image data-22 comprises a number of visual spectrum images of the same scene.

The combiner 12 contains an edge matcher 24 for matching edges of the thermal image data 20 with edges of the visual image data 22.

Figure 2:
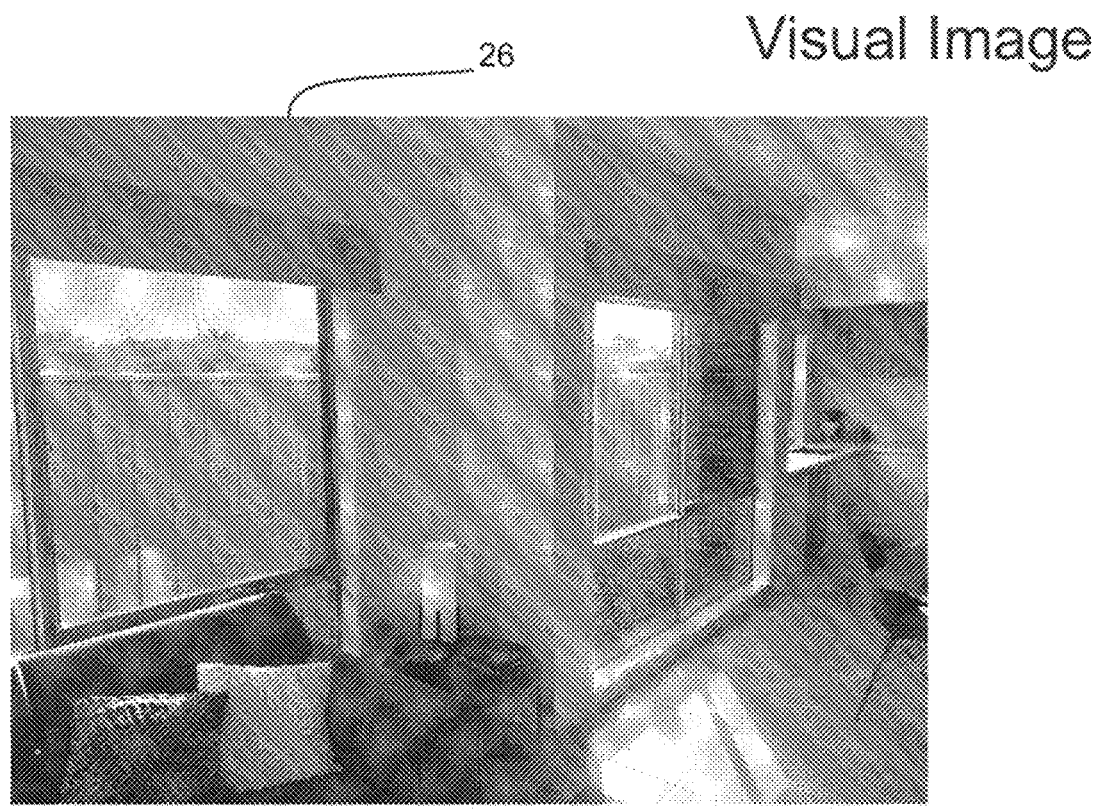
FIGS. 2 to 5 provide several views of an edge detection approach used in the thermal audit system shown in FIG. 1.
Figure 3:
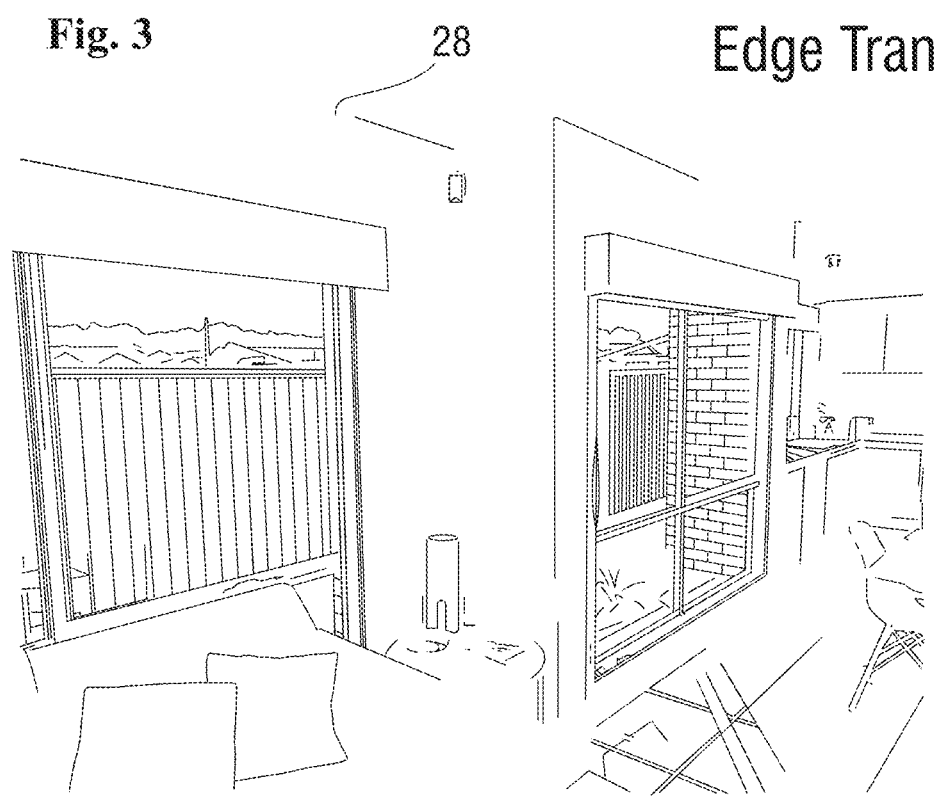
Figure 4:
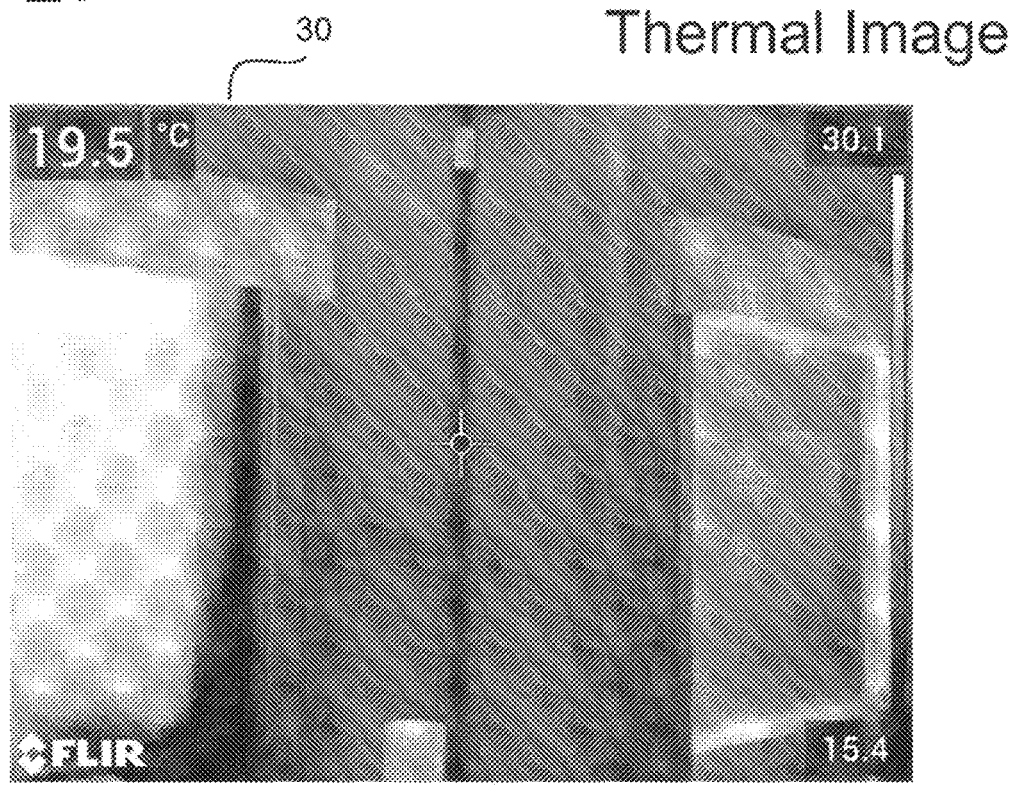
Figure 5:
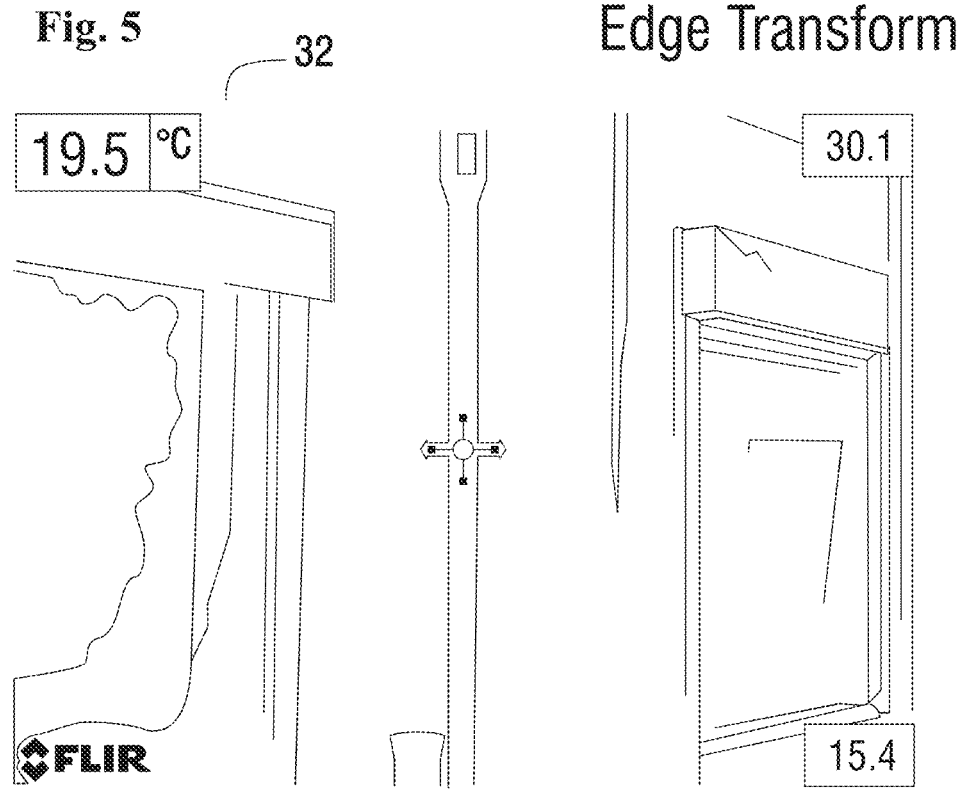

This is shown in FIGS. 2 and 3 where the visual image data 26 is edge transformed to image data 28 and thermal image data 30 is edge transformed to image data 32. The image data 28 and the image data 32 more readily reveal features such as a lamp, the top of the couch, a cushion and lamp shade. The edge matcher 24 advantageously matches edges of data sets 28 and 32 to associate the thermal image data 30 with the distance information 14. This arises because visual data 22 is associated with distance information 25. In this embodiment the distance information 25 comprises distance derived information using SLAM techniques during capture of the visual images 22. Other approaches are of course possible in different embodiments.

In relation to the system described above, it is to be appreciated that markerless augmented reality systems are available for smart devices. This is an area that has seen rapid development.

There are now systems available that provide for 3d mapping of a physical scene with object and face recognition These systems typically each apply simultaneous localization and mapping (SLAM) techniques to map the real physical scene while keeping track of the viewpoint location and orientation of the point of capture.

As detailed on Wikipedia, algorithms employed in SLAM technology could include Bayes's Rule and the EM algorithm. Techniques that may be applied include Kalman filters and particle filters (Monte Carlo methods), set membership techniques, interval constraint propagation, bundle adjustment and MAP approaches. Wikipedia further notes that: 'Bundle adjustment, and more generally Maximum a posteriori estimation (MAP), is another popular technique for SLAM using image data, which jointly estimates poses and landmark positions, increasing map fidelity, and is used in commercialized SLAM systems such as Google's ARCore'.

It is further noted that 'New SLAM algorithms remain an active research area, and are often driven by differing requirements and assumptions about the types of maps, sensors and models . . . '

Software development kits for augmented reality are available in the market. These kits include the ARKIT 2.0 framework offered by Apple. The framework makes use of Apples smart device functionality including the camera, tracking sensors and software intelligence. More particularly, ARKIT 2.0 makes use of SLAM to recognise the scenes being observed by the phone camera. ARKIT provides space recognition, object detection, smart tracking lighting estimation and other functionality.

Other Augmented Reality software development kits include ARCore offered by Google for the Android platform. Similarly to ARKIT, ARCore provides for space recognition, object detection and lighting estimation.

A search of the Internet reveals a large number of Augmented reality software development kits including Wikitude, EasyAR, ARmedia, Vuforia, OpenCV, Maxst, DeepAR, and ARToolKit. Among other features, such systems provide simultaneous localization and mapping, space recognition. object detection, smart tracking, image recognition, geolocation, face recognition, emotion detection, cloud storage, and 3d model importing/exporting.

'FAST DEPTH DENSIFICATION FOR OCCLUSION-AWARE AUGMENTED REALITY' by Aleksander Holynski (University of Washington) and Johannes Kopf (Facebook) ACM Transactions on Graphics (Proc. SIGGRAPH Asia), Volume 37, 6, 2018 claims to provide 'sparse depth to every pixel in near real-time.' In this regard it is considered that systems offered by Augmented reality software and system providers will continue to develop object and scene recognition features to match and exceed those presently available. Object recognition algorithms will be able to recognise objects such as doors, floors, ceiling walls, lighting, carpentry, electrical outlets and so forth.

Even at this time, Smart Picture Technologies Inc provides a mobile application termed 'PLNAR' providing a 3d modelling augmented reality iOS application. The application is directed at home remodelling and design companies. The system is used to quickly measure floor plans, doorway sizes and other building features.

A search of the US patent database by a patent attorney located Smart Picture Technologies Inc's patent application US20190051054A1. This application illustrates various approaches to measuring floorplans, carpentry, windows, ducts, vents, electrical outlets and building features in general. This was considered to most likely have been enabled by ARKIT at the time of filing the patent application.

In US20190051054A1 recognised shapes include polygons and curves. These are said to be matched to doors, windows, wall openings, electrical outlets, vents, ducts, counters, island counters, cabinets, appliances, damage and so forth. The systems are said to make use of Apple's ARKIT in a particular workflow. Notably competitors to Smart Picture Technologies provide competing applications. Object recognition of doorways, benchtops, stoves, ducts, windows and so forth is considered a realisable proposition using feature mapping techniques associated with augmented reality.

It is considered that further patents in the field of augmented reality will continue to be published and SLAM related object recognition will continue to evolve. U.S. Pat. No. 8,791,960 details aspects of feature tracking. U.S. Pat. No. 9,741,170 notes that 'when a 3 dimensional object is recognized, an amount of data increases'. U.S. Pat. No. 9,269,022 concerns silhouette and other mapping. U.S. Pat. No. 9,589,372 relates to a change in the field of view in relation to an object.

The development of software development kits shows smart recognition aspects including the ability to recognise walls, floors, and ceilings and provide scene context aware information. For example, the software development kit videos provided by WHODAT on YouTube show the intended ability to readily move a picture frame from one wall to another. WIKITUDE, Vuforia and other SDKs currently provide some general object recognition. Improvements in computing speed, SLAM algorithms, and processing within the cloud will allow rapid building of 3D models with detailed object recognition and tracking. Embodiments of the present invention may involve sending the thermal image data-20 and the visual image data 22 to a cloud service after being captured.

Figure 6:
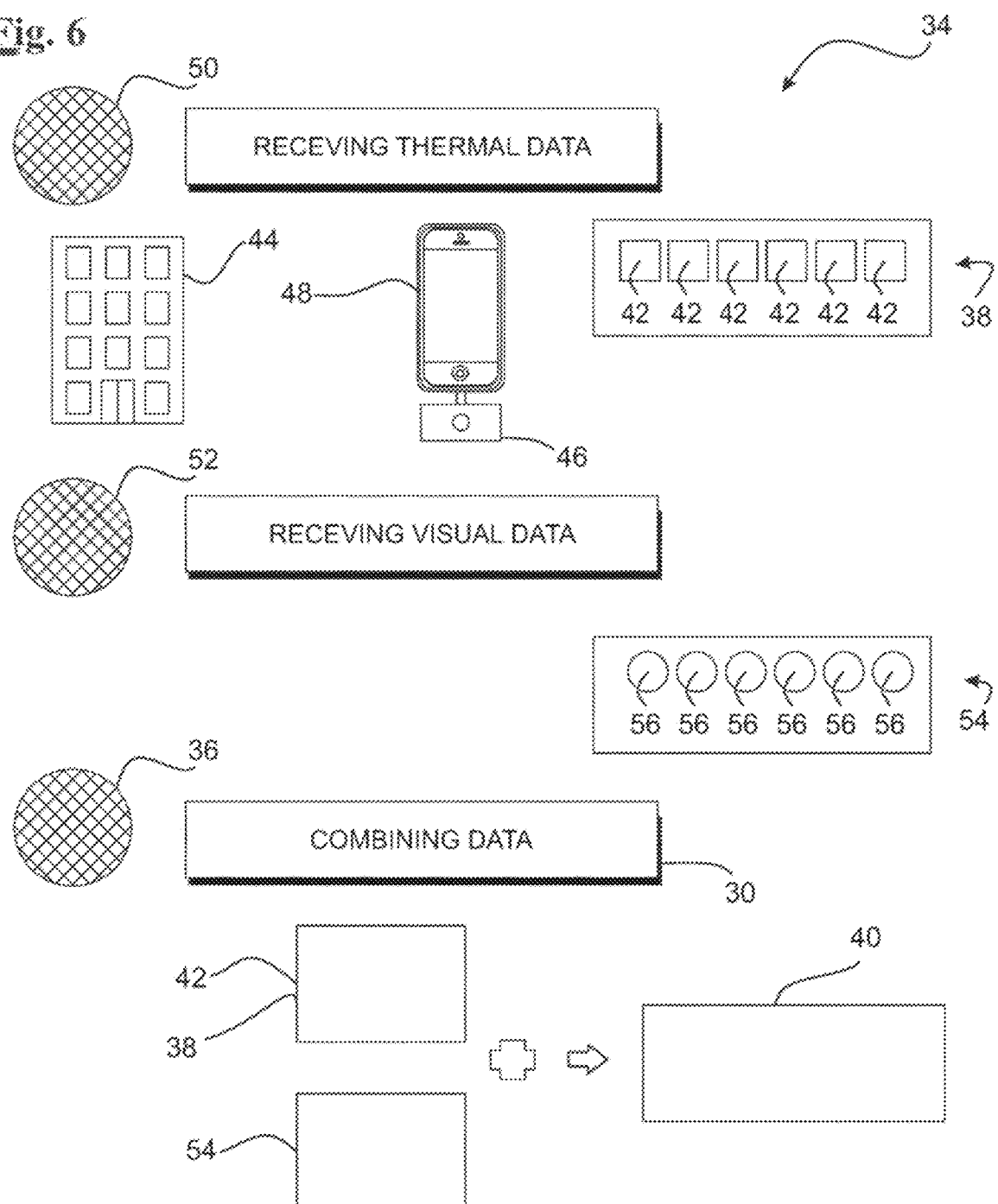
FIG. 6 provides a schematic view of a computer implemented thermal audit method according to another preferred embodiment of the present invention.

Referring to FIG. 6, there is shown a computer implemented thermal audit method 34 according to a further preferred embodiment of the present invention. At block 36, the method 102 includes combining thermal image data-38 for determining distance information 40 The thermal image data 38 comprises a series of thermal images 42 of a building 44. The thermal images 42 are captured using a thermal imaging device 46 attached to a smart phone 48.

At block 50, the method 102 includes receiving the thermal images 42. At block 52, the method 102 includes receiving visual data 54 in the form of visual images 56.

At block 36, the method 20 includes combining the thermal image data-38 with the visual image data-54 to provide the distance information 40 in relation to the thermal image data 38. The visual data 54 comprises a series of visual images of an internal scene of the building 44. The visual data 54 is processed using a software development kit that associates the visual data 54 with a 3d representation of the room. The thermal data 38 is then advantageously combined with the visual data 54 to associate the thermal data 38 with the 3d representation of the room. In this manner the distance information 40 is provided.

Figure 7:
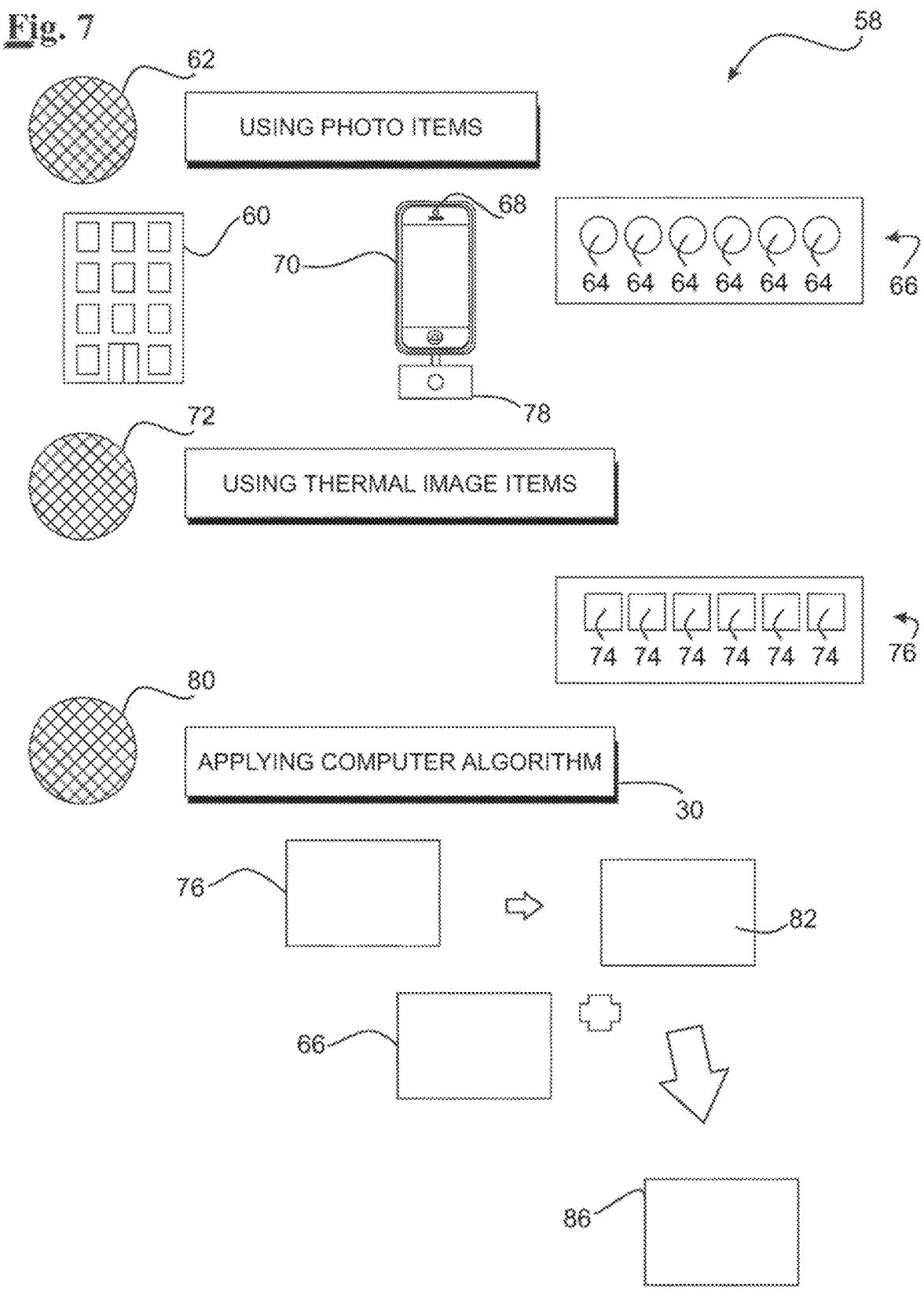

Referring to FIG. 7 there is shown a computer implemented structural thermal audit method-58 according to a further preferred embodiment of the present invention. The method 58 forms part of an overall structural thermal audit that is performed by an assessor. The thermal audit is performed with a view to developing an energy and thermal efficiency remediation strategy. In this embodiment the audit is performed on a building 60.

At block 62, the method-58 includes using items 64 of photograph data 66. Each item 64 of photograph data 66 is of the building 60 from a viewpoint where the item-64 of photograph data 66 is based on the visual spectrum as would be seen by the human eye.

Each item 64 of photograph data 66 comprises a JPEG image that is taken using an inbuilt camera-68 of a smart phone 70. The items 64 provide different viewpoints of the building 60 as is requested by the assessor.

At block 72, the method 58 includes using items 74 of thermal image data 76. Each item 74 of thermal image data 76 is of the building 60 from a viewpoint where the item 74 of thermal image data 76 is based on the thermal spectrum as would be seen by a thermal imaging camera 78. The thermal imaging camera 78 comprises a thermal camera attachment 78 for the smartphone 70.

At block 80, the method 58 includes applying a computer algorithm 30. The algorithm 30 identifies thermal areas of interest 82 in connection with the thermal image data 76 and combines the thermal areas of interest 82 with the photograph data 66. The resultant combination provides overlaid data 86.

Figure 8:
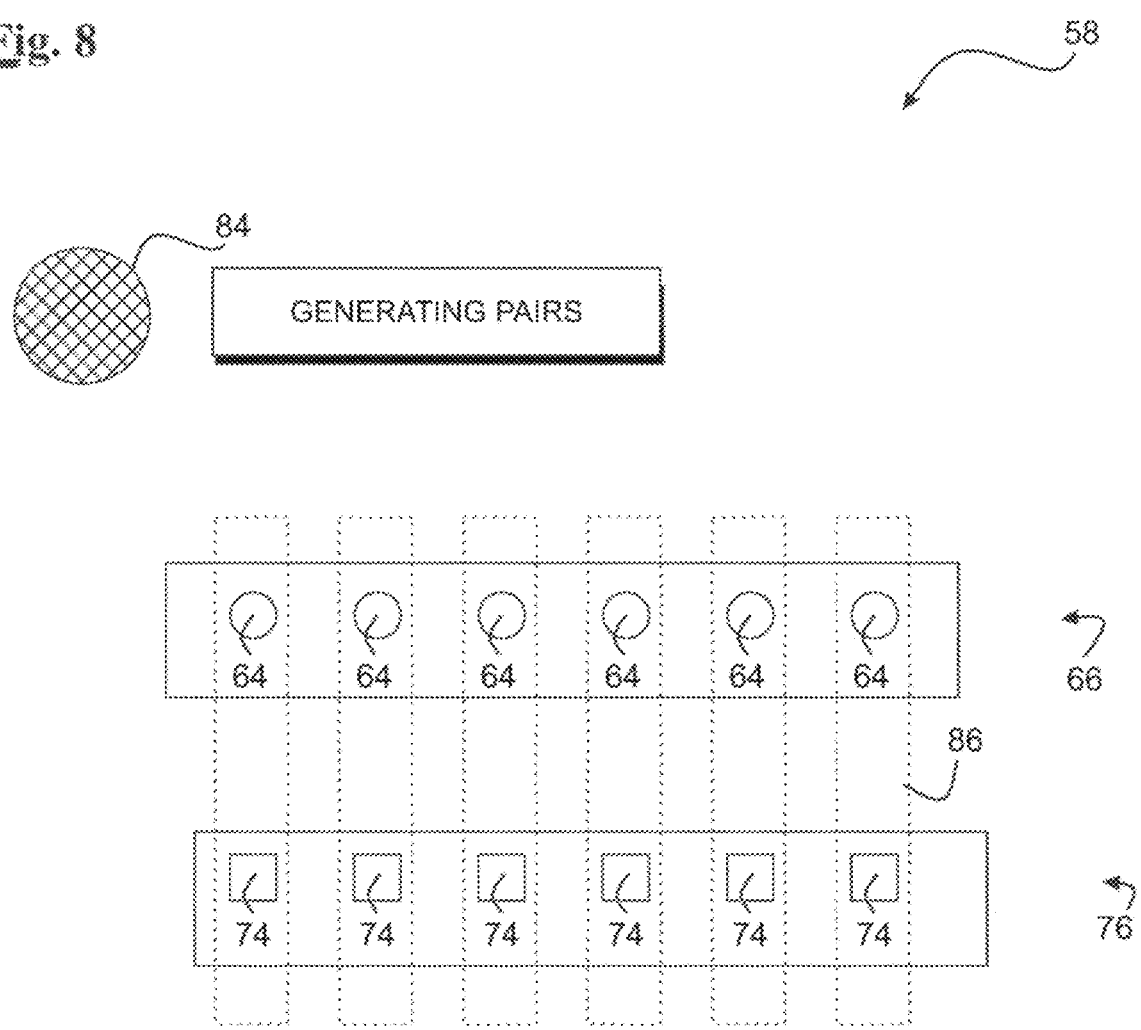

At block 84 shown in FIG. 8, the method 58 includes generating associated pairs 86 each comprising an item 64 of photograph data 66 and an item 74 of thermal image data 76.

Each pair of items 86 includes a unique item of 64 of photograph data 66 and a unique item 74 of thermal image data 76. Due to the pairing, each item 64 of photograph data 66 corresponds with an item 74 of thermal image data 76 on a one to one basis.

At block 88, the provision of the pairs 86 is performed by repeatedly: (a) collecting an item 64 of photograph data 66 from a first viewpoint 90 using the camera 68 with the first viewpoint 90 having a direction 92 (horizontal and vertical) and a base location 94 and collecting an item 74 of thermal image data 76 from a second viewpoint 96 using the thermal imaging camera 78 wherein the second viewpoint 96 has substantially the same direction 98 and base location 100 as the first view point 90 and (b) changing the first viewpoint 90 to collect another pairing 86.

Figure 10:
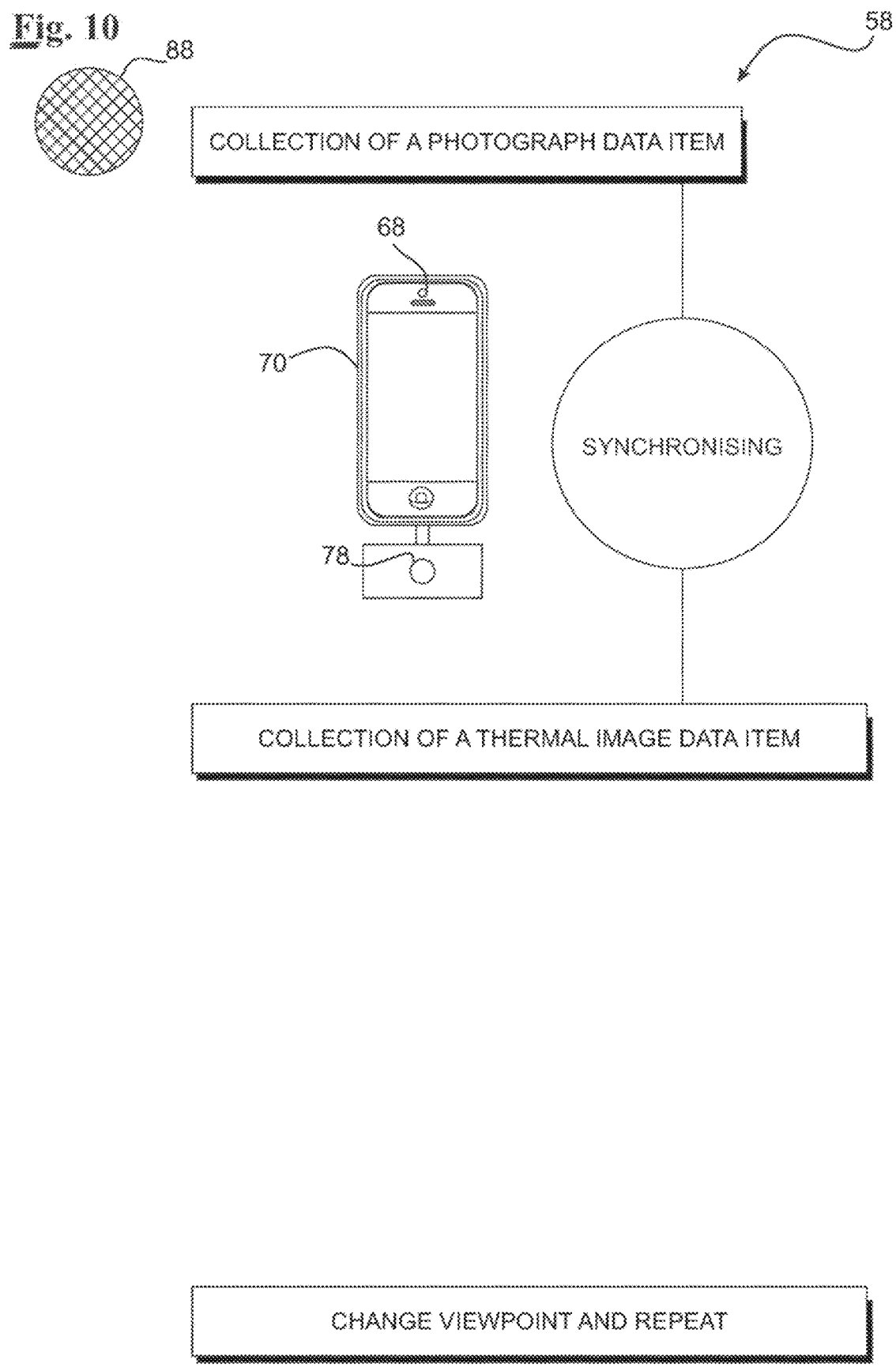

Referring to FIG. 10, at block 88, the method 58 includes synchronising the camera 68 and the thermal imaging device 78, using a controller, to assist with ensuring that the first viewpoint and the second viewpoint of the items in each pair 86 have the same direction and base location (substantially). The synchronisation is achieved by causing a photograph 64 to be taken within a very short time after a thermal image 74 is taken. The precise timing will of course depend on the hardware utilised.

If the hardware dictates that a time in the order of seconds is the minimum time, the synchroniser will provide an indication when the camera can be moved. In this embodiment the hardware allows a time less than one second, and the method 58 includes ensuring that each item 64 of photograph data 66 is collected within less than 1 second after an item 74 of thermal image data 76 is collected. Other embodiments may not have a timing limitation. Rather the operator would rely on the visual and thermal images looking similar and in line. Particularly it is noted that augmented reality techniques could be used that take feature points and apply a mapping to superimpose a thermal image on top of model generated by an augmented reality approach.

Figure 11:
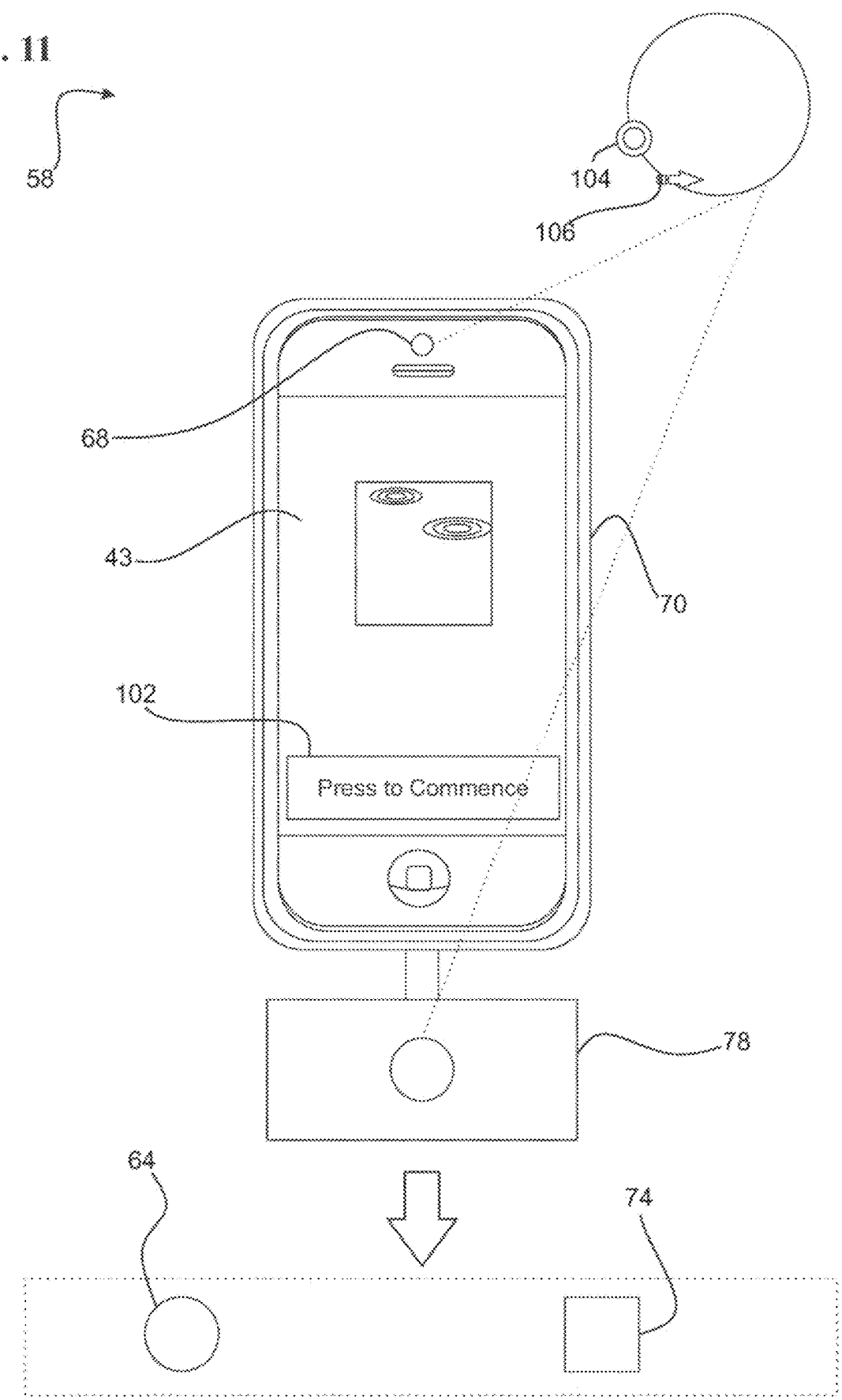
FIG. 11 provides a schematic view of the collection of data according to the embodiment shown in FIGS. 7 to 10.

Referring to FIG. 11, a single button 102. is pressed on the mobile phone 70 from a base location 104 in a direction 106 to collect a pair 86 having an item 64 of photograph data 66 and an item 74 of thermal image data 76. The item 64 and the item 74 are taken from substantially the same position 104 and direction 106. After the button 102 is pressed, the assessor is provided with an alert advising that the direction and position of the smart phone 70 can be changed.

Figure 12:
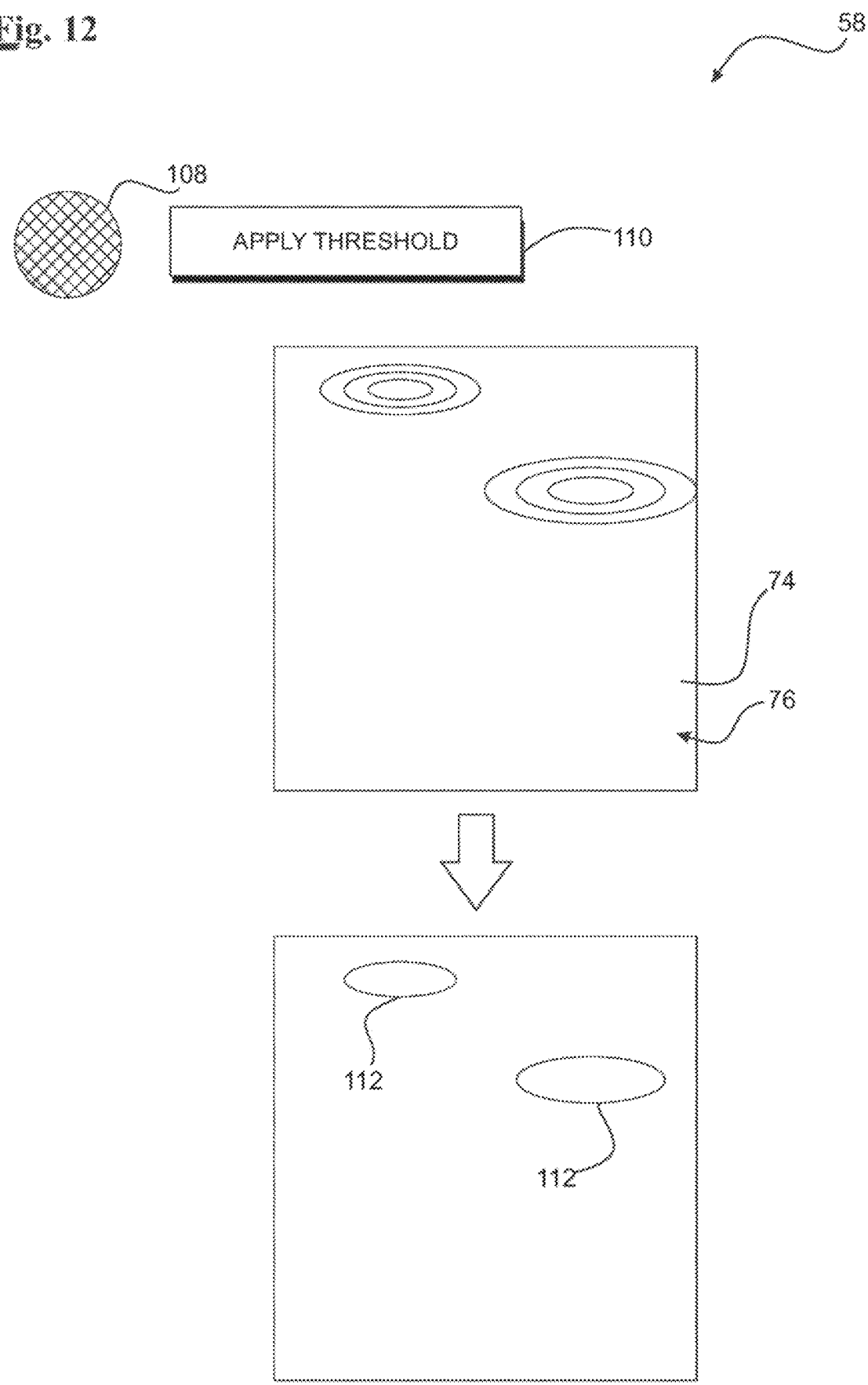

As noted, block 80 provides for combining the areas of interest 82 in connection with the thermal image data 76 with the photograph data 66. Referring to FIG. 12, at block 108 the approach includes applying a threshold 110 to the thermal imaging data 76. This returns all temperatures in a range above a set anomaly minimum temperature. In applying the threshold, a mask is applied to the image.

At block 108 the method 58 includes analysing the resultant 'thresholded' selection of thermal image data 76 to provide the thermal areas of interest 82 as areas of interest 112. The areas of interest 112 are determined using a smoothing approach to remove small areas, holes and to reduce jagged edges. The smoothing approach may depend on the resolution of the thermal image 74.

Figure 13:
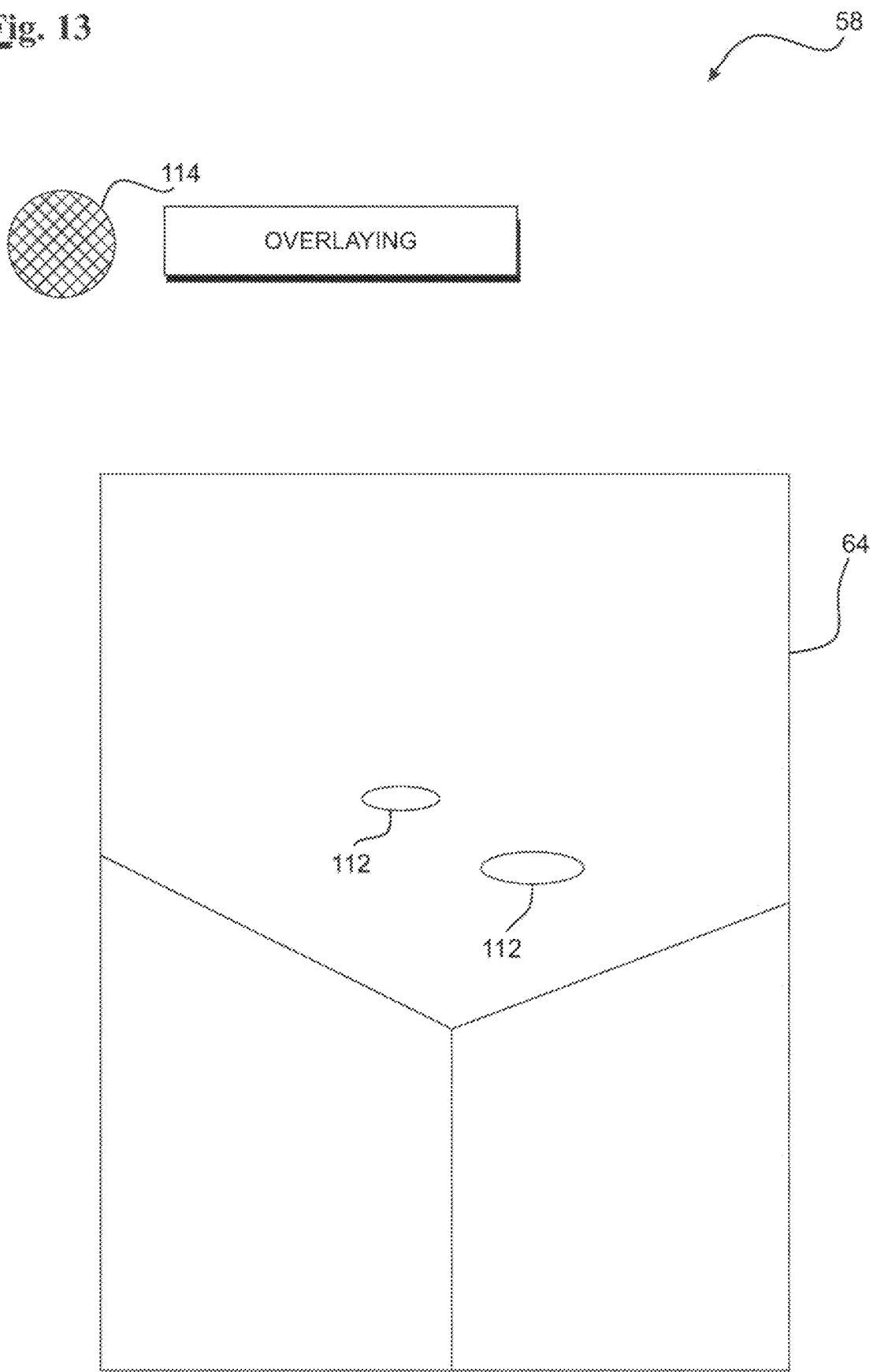

Referring to FIG. 13, At block 114, once the areas of interest 112 have been identified, the method 58 includes overlaying the areas of interest 112 on the photograph data 66 to highlight and represent the areas of interest 112 in relation to the paired photograph data 64.

The areas of interest 112 are combined with the corresponding item 64 of photograph data 66 in the pair 86. In this manner each item 64 of photograph data 66 is combined with the corresponding item 74 of thermal data 76.

Figure 14:
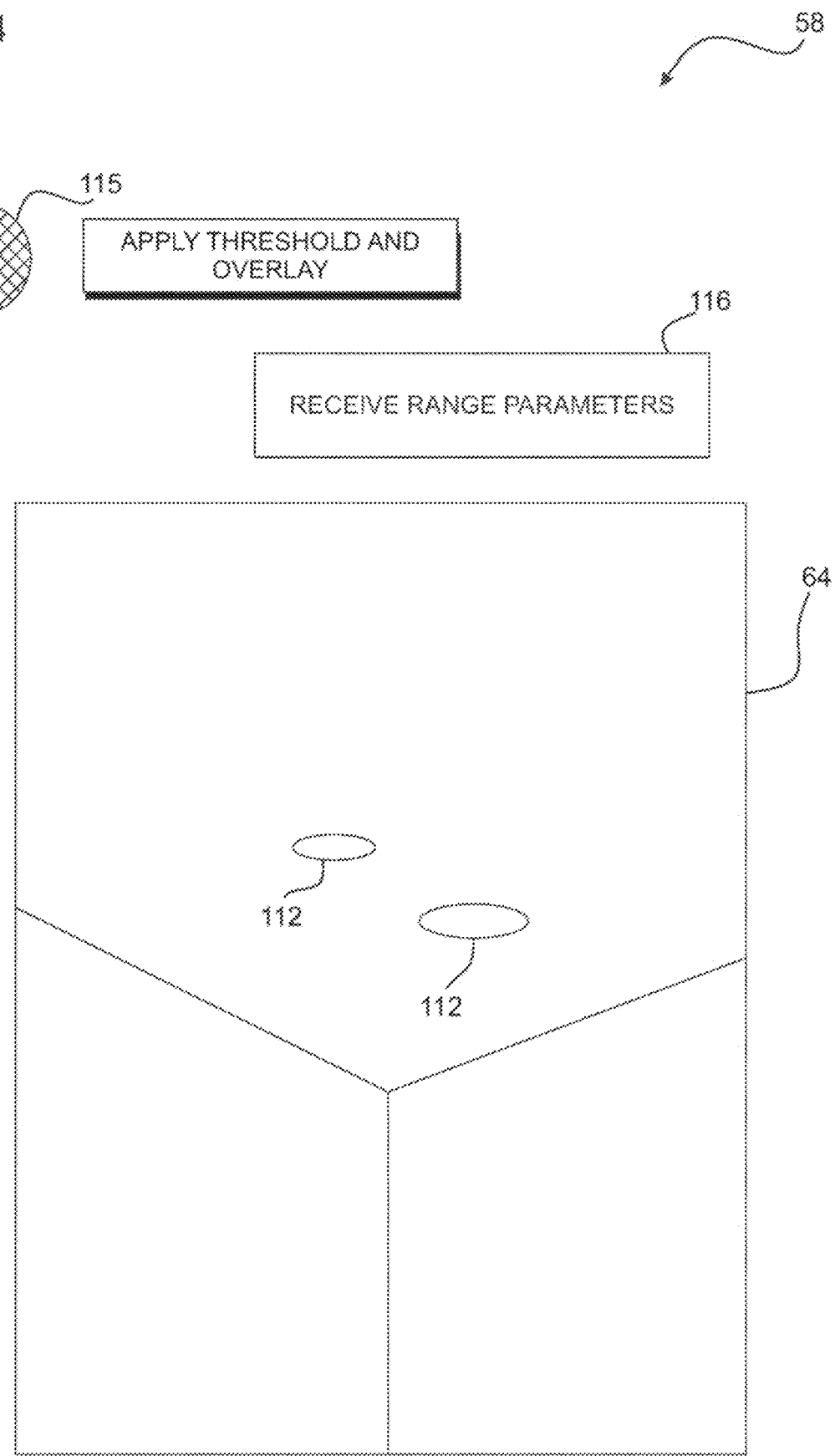

Referring to FIG. 14, the method 58 at block 118, includes combining the areas of interest 112 with the photograph data 66 only where the thermal image data associated with the areas of interest is within a temperature range 116. The method applies a threshold and then overlays the data.

Referring to FIG. 15, at block 118, the method 58 includes estimating the total surface area of the areas of interest 112. This is done using a geometrical approach using position data. More specifically, the method 58 allows the assessor to enter an angle of inclination, and a distance to a point. In this embodiment a first angle to vertical is specified by entering a vertical type of "Horizontal Ceiling". The camera angle (recorded at the time of taking the photograph data) is shown and can be adjusted. The user enters the distance to a point marked X to generate the estimated surface area. In this embodiment 'x' is central to the viewport 120 of the thermal image.

As shown in FIG. 16, the method includes allowing an assessor to delete thermal areas of interest. This could occur when the assessor has taken two images of the same thermal anomaly or a thermal anomaly is only partly within a thermal image.

It is noted that some thermal imaging cameras have a laser distance finder. Furthermore, some thermal imaging cameras are now available where they physically connect to the mobile hand device. FLIR ONE is a well-known brand and model thermal camera that does not collect distance information. Various thermal imaging devices may be integrated into a mobile computer device via Bluetooth or Wi-Fi.

Furthermore, in other embodiments a laser scanner may determine the position of scanned points of the structure to automatically determine the surface area without the assessor having to specify distance and one or more angles. One possible laser scanner that might be able to be used comprises a scanner provided by 'Structure by Occipital' (https://structure.io/). Laser scanners have the potential to provide a great deal of information that may be able to provide higher accuracy.

FIGS. 17*a* to 17*j* illustrate various wireframes of a further embodiment according to the present invention. A thermal image 122 is displayed on the screen 124 of a computer tablet 126. The thermal image 122 shows the thermal output from a thermal device 128 attached to the tablet 126. Once the assessor is happy with the image 122, the assessor presses the button 130 to record the thermal image 122 from the viewpoint shown.

The thermal image 122 is saved in JPEG format. As soon as possible after the thermal image 122 is saved, a photograph 132 is taken using a visual camera 134 of the tablet 126. The photograph 132 shows what would be visible to the human eye. The thermal image 122.shows the thermal spectrum. The approach here is to match the camera positions of the visual camera 134 and the thermal image camera. It is considered possible to provide communication so that the thermal image 122 and the photograph 132 are taken at the same time.

The thermal image 122 is generally of a lower resolution and viewport size than the photograph 132 (visual image).

The system uses an edge based transform to attempt to place the thermal image 122 over the visual image 132. The assessor is also able to move and scale the image using conventional squeeze and drag controls that are often used by computer tablets.

In embodiments there may be an initial calibration stage for determining how images of the thermal imaging camera and the handset camera will align, once they have been connected so that all future images will be lined up without having to apply a transformation that matches features.

The assessor then presses a button 136 to specify various points 138 on the thermal image 122. The points 138 are used to determine a base thermal anomaly temperature by averaging. The user is also able to press a button 140 to specify a number of thermal normal points 156. The points 156 are used to determine a base normal temperature by averaging. A threshold 142 is specified at the time of image capture. The threshold 142 defines the range of temperatures to represent an anomaly relative to the base thermal anomaly temperature. This can be manually set by the operator.

The assessor is able to enter a base distance 144 associated with the image (i.e. the estimated distance to the central point in the photograph image). The recorded angle of camera inclination 146 is able to be adjusted using a button 148. The recorded angle is initially automatically captured using an inclination sensor forming part of the tablet/handset 126.

Figure 17B:
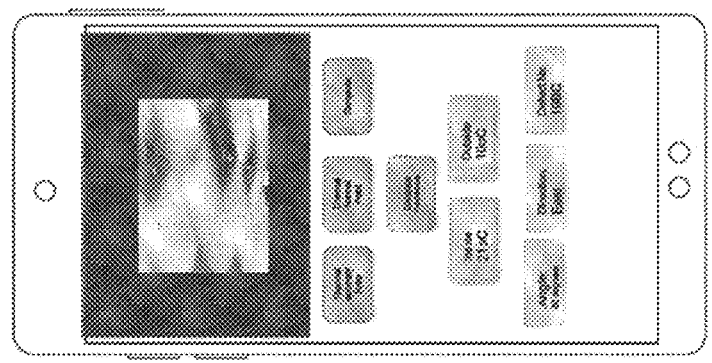
FIGS. 17a to 17j provide schematic views of a method according to another preferred embodiment.
Figure 17A:
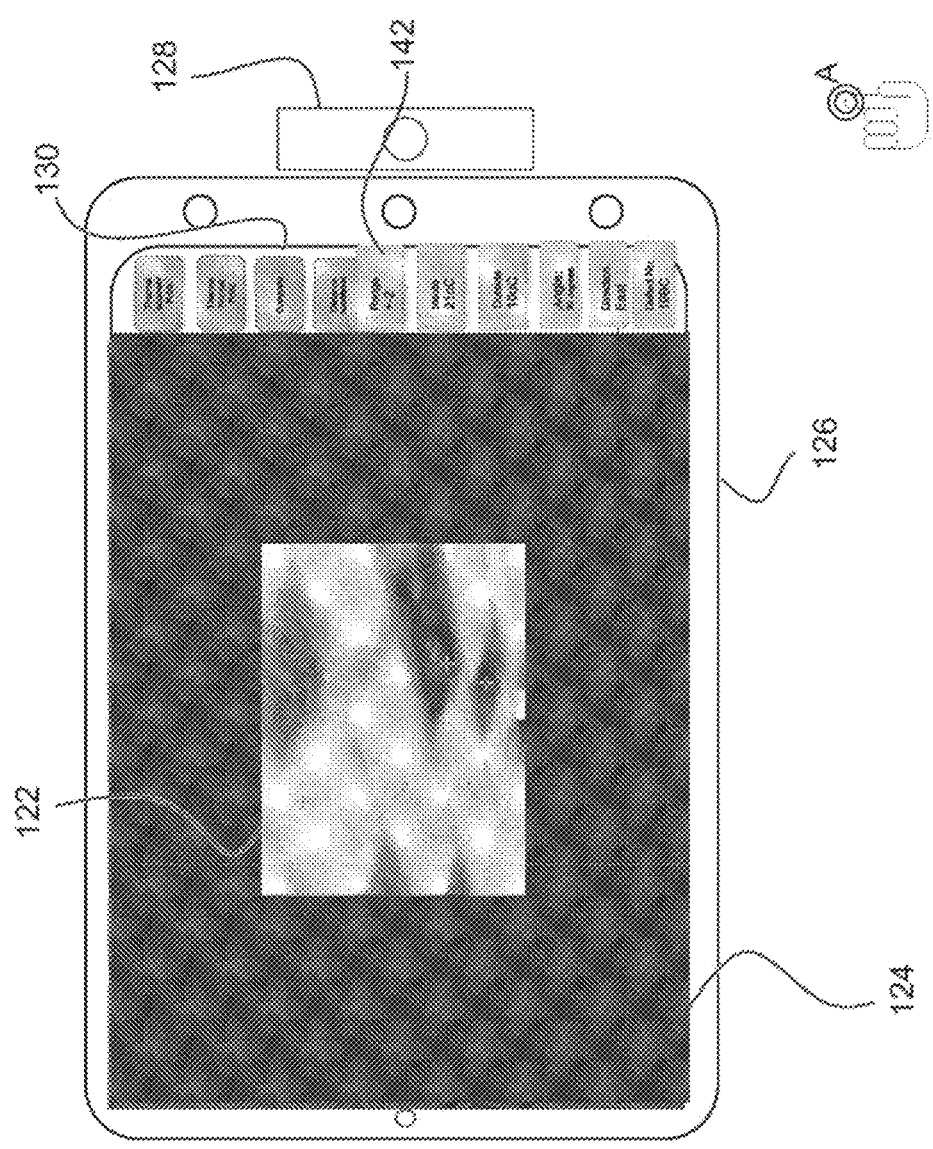
Figure 17D:
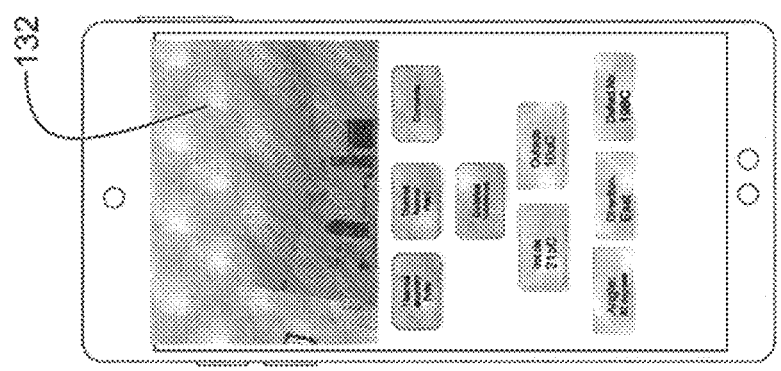
Figure 17C:
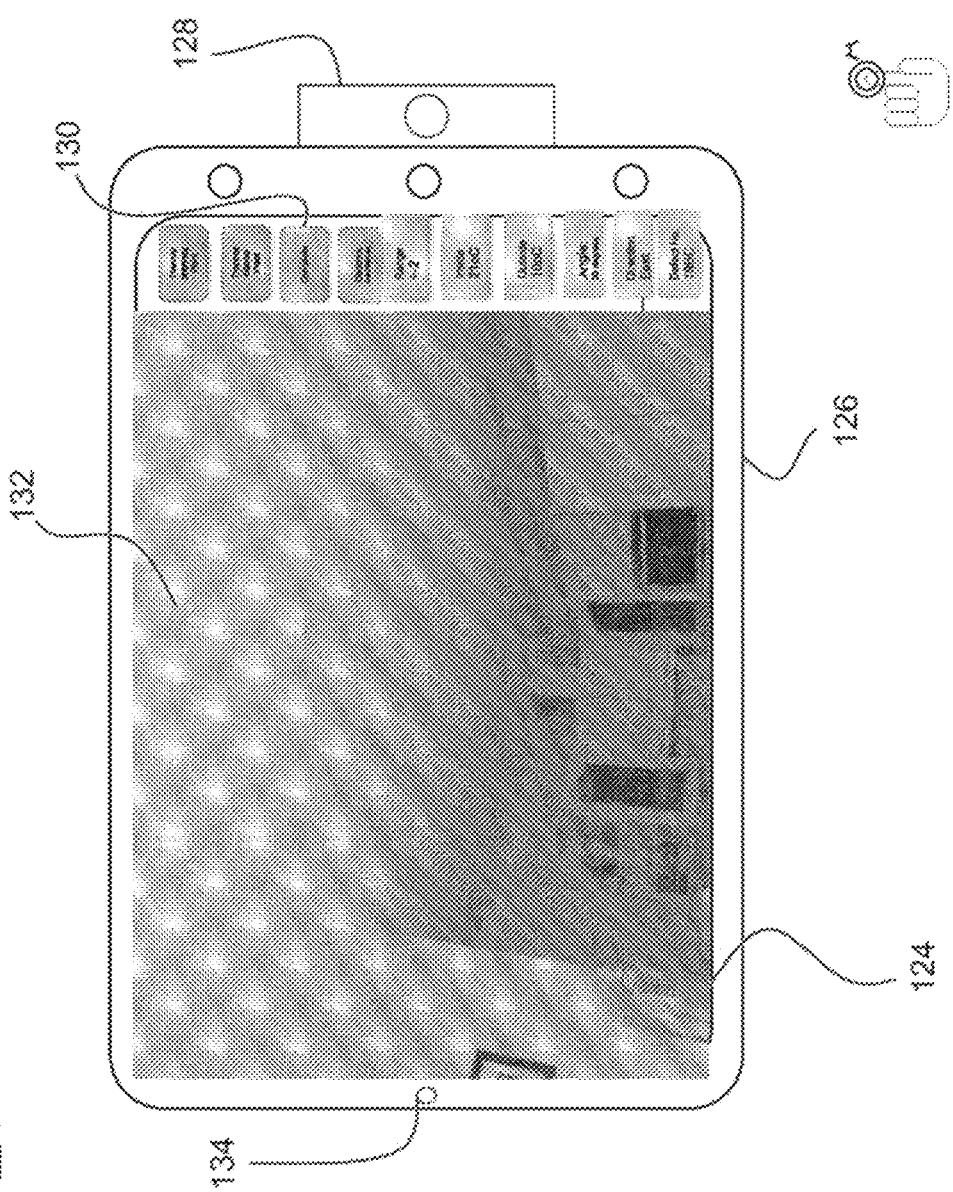
Figure 17F:
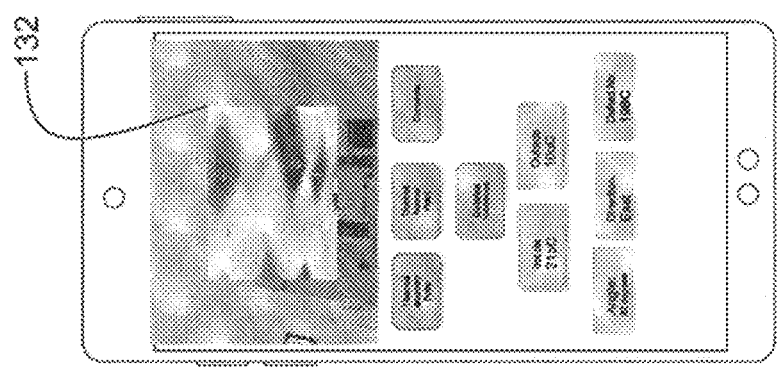
Figure 17E:
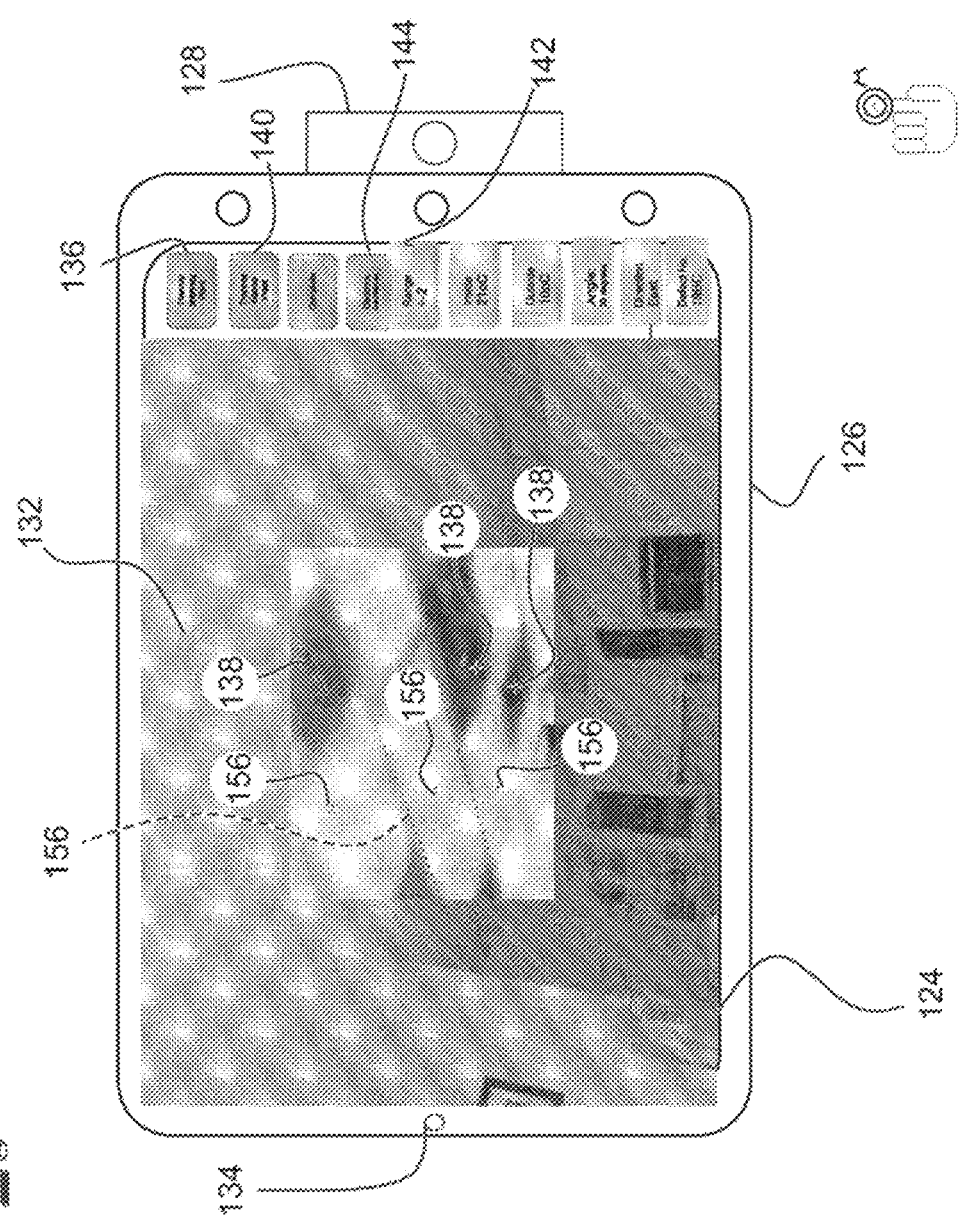
Figure 17H:
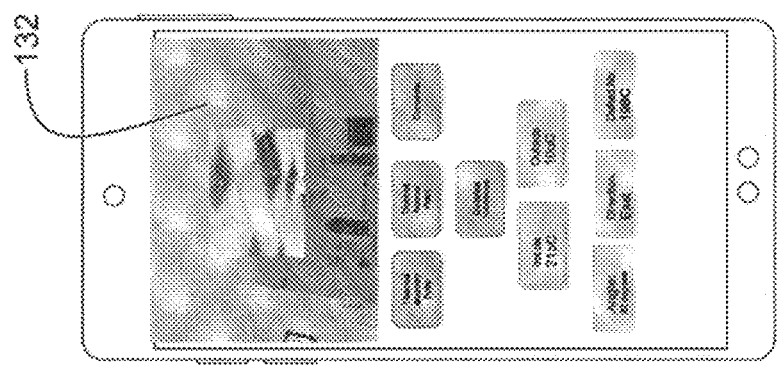
Figure 17G:
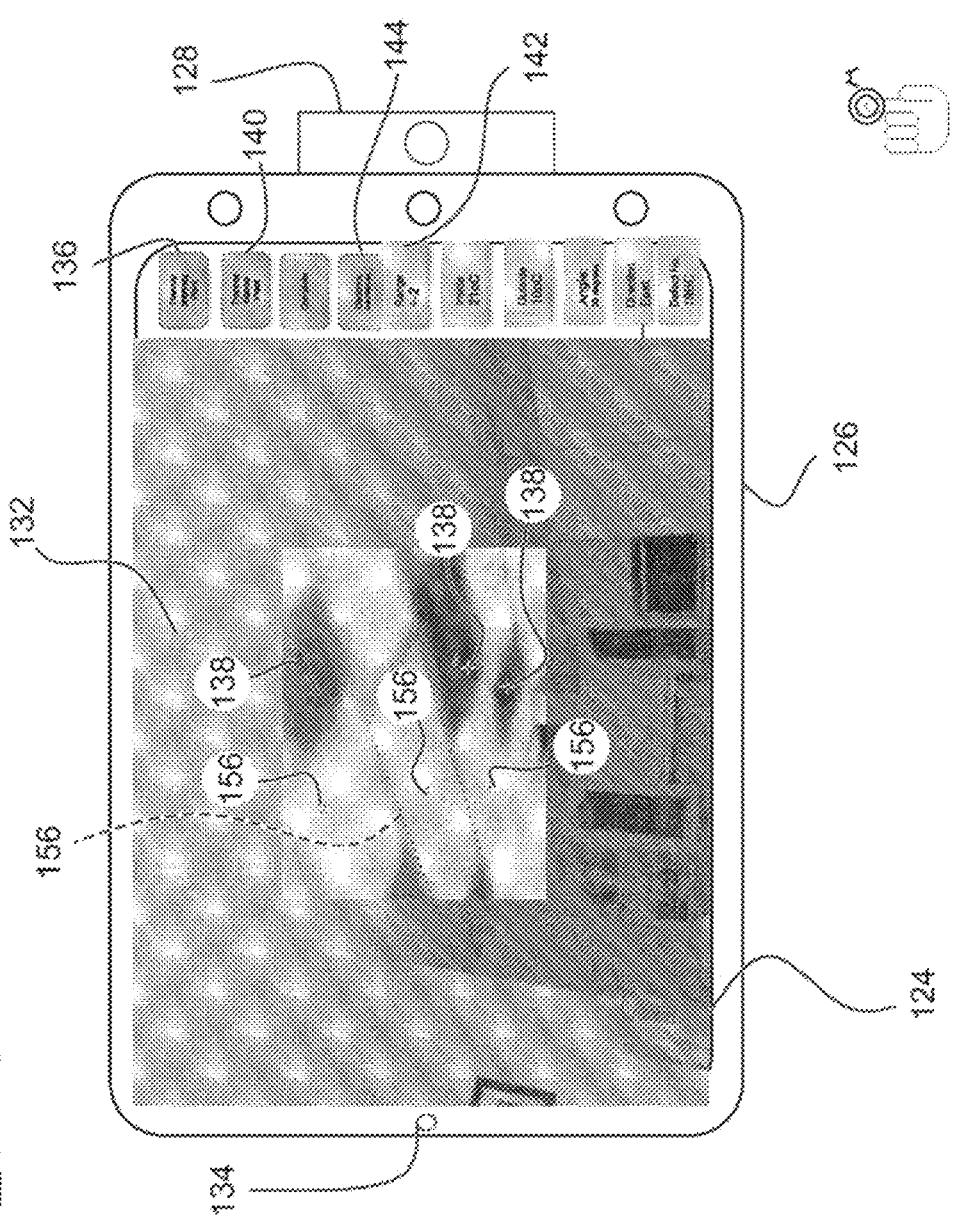
Figure 17J:
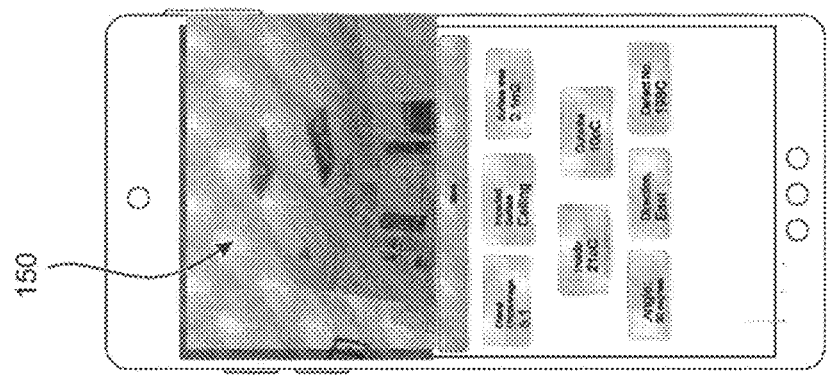
Figure 17I:
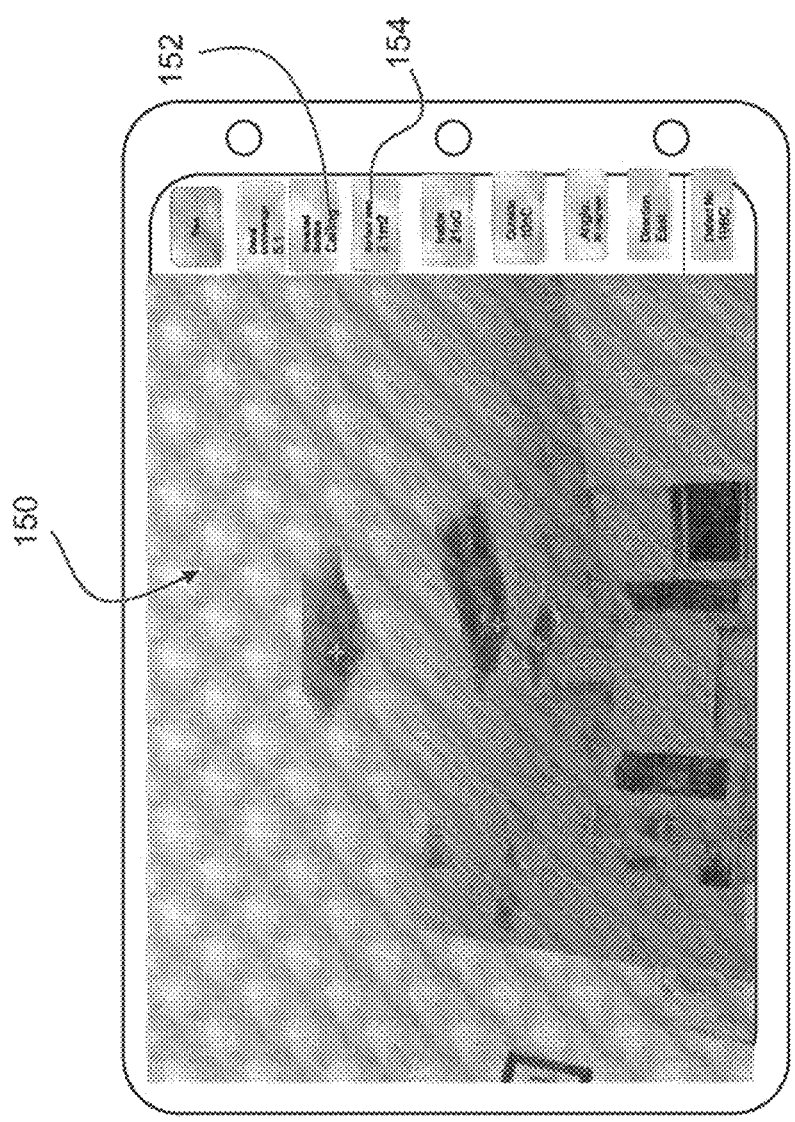
Figure 18B:
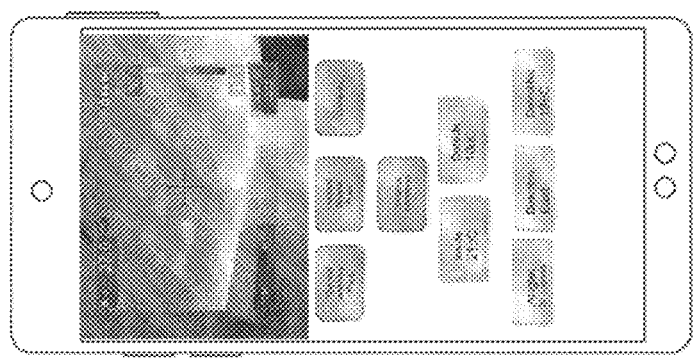
FIGS. 18a to 18d provide schematic views of a method according to another preferred embodiment.
Figure 18A:
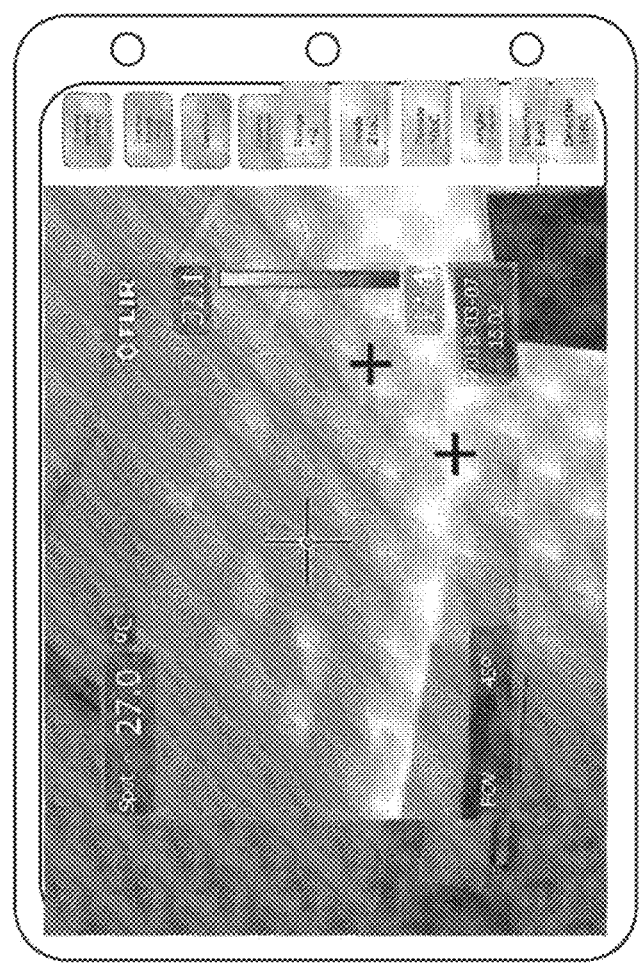
Figure 18D:
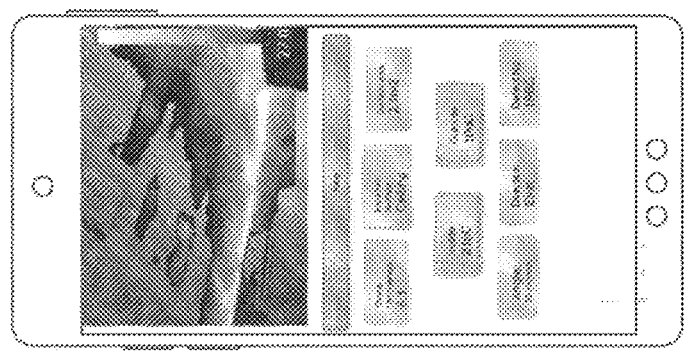
Figure 18C:
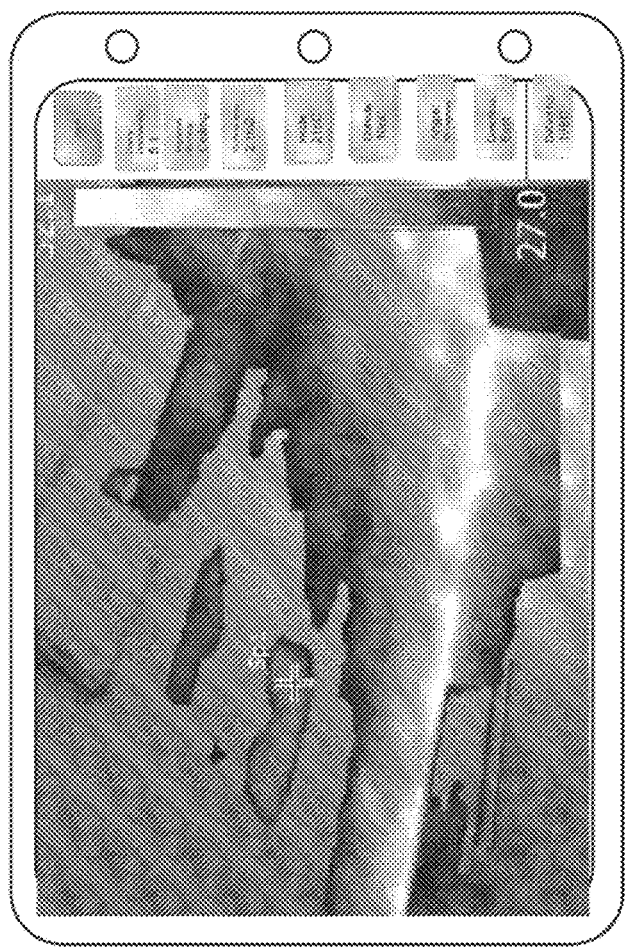

Referring to FIG. 17i, the thermal image 122 is subsequently combined with the photographic image 132 using a threshold approach. A mask is applied based on the thermal anomaly temperature in combination with the range 142. As a result, an overlay 150 is provided. Once the overlay 150 is provided, the assessor specifies a surface angle of 180 degrees by specifying a "Ceiling" type 152. In this embodiment a simplified approach is used by having a facility that allows the user to select "horizontal ceiling" or "vertical wall" types. By selecting a "ceiling" (assumed horizontal) it is possible to use the distance 144 and angle of the camera to determine the perspective of the ceiling and anomaly sizing. This allows the calculation of a surface area anomaly size 154

Surface areas may be calculated using various approaches such as possibly by various lens focal length and/or direction techniques. In this embodiment the user must enter in an estimated distance to the centre of the thermal image. By recording this information and camera inclination, surface areas are able to be advantageously estimated provided that camera angle produced by the hand held device and/or surface angle are specified.

For completeness it is noted that the buttons in 17a to 17h read: 'Thermal Anomaly Point'; 'Thermal Normal Point'; 'Complete'; 'Distance'; 'Range: +/−2'; 'Inside:21 deg C.'; 'Outside: 10 deg C.'; 'Angle 30 degrees'; 'Direction: East'; 'Defect No 19BC'. The buttons in 17j to 17k read: 'SAVE'; 'Overall Uncoverage: 5.1'; 'Impacted Surface: Ceiling'; 'Surface Area: 21.m2'; 'Inside:21 deg C.'; 'Outside:10 deg C.'; 'Angle 30 degrees'; 'Direction: East'; 'Defect No 19BC'. Various buttons and displays are possible.

Other approaches are possible. For example, referring to FIG. 17e, if the user knew the size of an insulation batt 156 then sizing and perspective information could be determined. Notably the thermal image of FIG. 17e shows that insulation is not applied around a number of downlights. Inside an outside temperatures and directions are recorded as part of the audit to allow for various scale factors to be applied.

A further possible approach would be to use SLAM technologies to provide position data in connection with the visual data. The overlaid areas of thermal data would be combined with the position data to provide estimates of the corresponding total surface areas.

The applicant considers that a number of approaches are possible.

Augmented reality markerless approaches can be used to in effect superimpose a thermal image by edge detection of features (or otherwise) to derive dimensions. This approach can be fully automated. Calibration of the thermal imaging device and fixing zoom levels could be used to improve accuracy and possibly remove the need for edge detection. This said edge detection approaches are currently preferred without the need for calibration.

In another approach, marker technology could be used in an augmented reality approach. Marker technology involves placing known markers having set features (such as a printed image) in the physical world. Marker technology is however relatively old technology and is presently not preferred.

In another approach, an image could be projected on a surface from a known position and angle to allow a feature mapping to calculate distances.

In yet another approach, knowing camera angle, a surface trigonometry approach could be used to estimate length from the number of pixels spanned by an anomaly. This is a basic approach using simple perpendicular imagery. Distance, focal length of the thermal image camera, resolution of the thermal image camera would be used to estimate actual extent in a rudimentary manner. The image taker would have to be perpendicular to the surface of the anomaly. This approach is not preferred.

Returning to the Figures, in this embodiment, it is possible to delete areas that have been cut off in the thermal image so that they are not double counted in the auditing of total surface anomaly area. A number of cut off areas are shown in FIG. 17i due to the limited thermal viewport size.

FIGS. 18a to 18d show further paired captures. The applicant is presently considering embodiments where it is possible to separate areas of interest. This is achieved with the use of a lasso tool that allows the selection of the one or more areas and subsequent separation (for example a wall and a ceiling). Lasso tools are available in image editing software such as Photoshop and The GIMP. This will effectively divide a paired item into two paired items. Other approaches are of course possible.

Figure 19A:
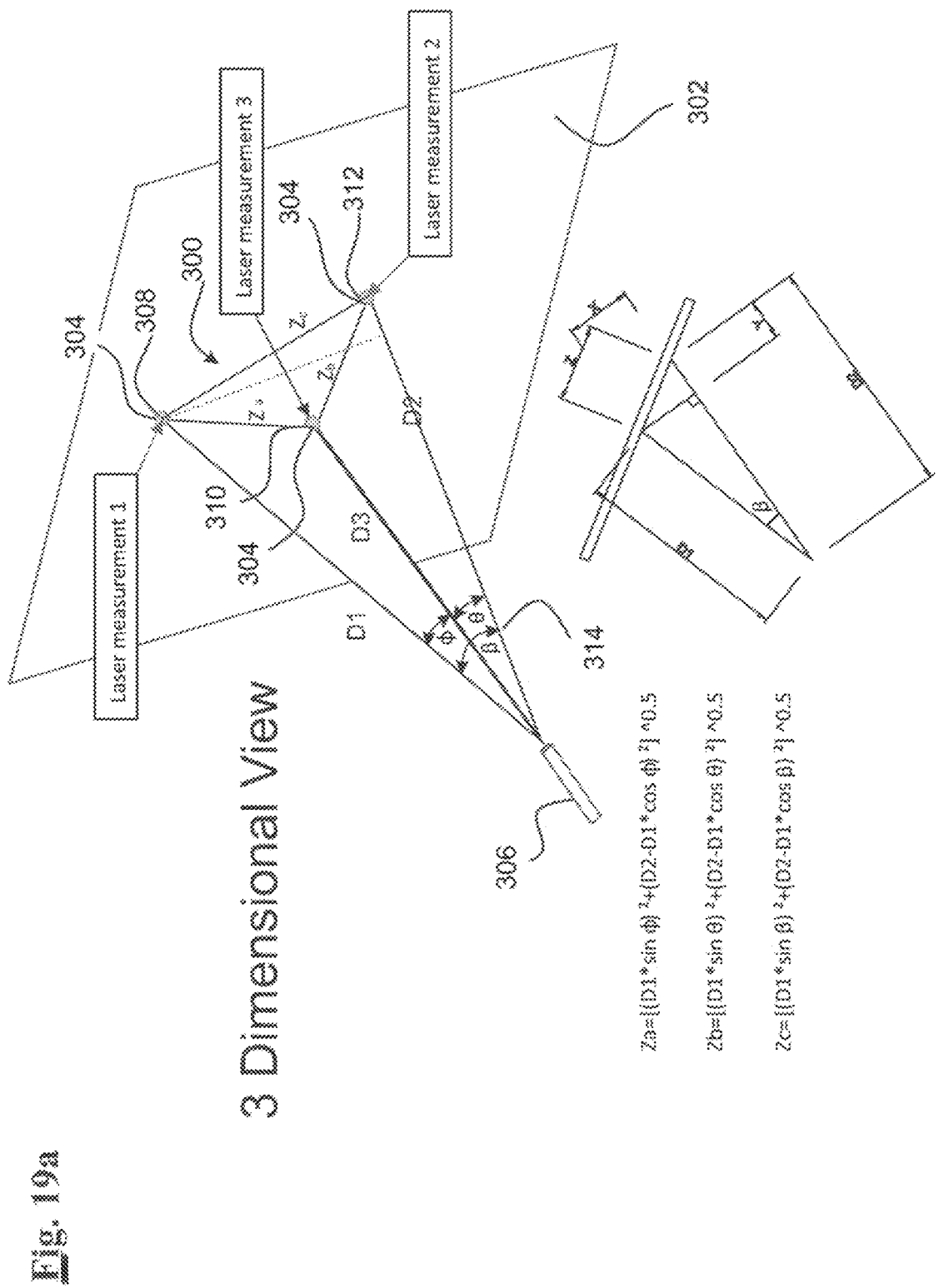
FIGS. 19a and 19b provide illustrative views of a system according to another preferred embodiment.

Another embodiment of the present invention comprises a projection approach. Referring to FIG. 19a, an image 300 is projected onto a surface 302. In this embodiment three laser dots 304 are projected using a laser arrangement. More particularly the three lasers distance detectors 306 are each used to respectively project one of the laser dots 304. The laser dots 304 comprise a laser dot 308, a laser dot 310, and a laser dot 312. The laser distance detectors 306 produce three distance measurements D1, D2 and D3 as shown. The laser distance detectors 306 are positioned so that it is possible to determine the direction of the surface 302 from the distance measurements D1, D2 and D3. For example, if dots 308 and 312 are taken the fixed angular relationship between the laser detectors provides a first angle 314. The distances D1, D2 and first angle 314 are used to provide a first distance 316 in the direction between the dots 308 and 312. This can be repeated for each dot 304 pairing. By knowing three angles and three distances the inclination of the surface 302 can be determined using trigonometry.

In another embodiment at least three distance measurements are taken automatically with a link to an electronic device. The angles separating the directions to each measurement are known and are set at the time of manufacture of the corresponding laser distance arrangement. The distance between each pair of laser devices is calculated using the formula: X/D I=sin θ; (D2−Y)/D 1=cos θ; $Z^2=X^2+Y^2$; $Z=[(DI*\sin θ)^2+(D2-D1*\cos θ)^2]$ "0.5 where θ is the angle between the distance measurements from the origin point. Various trigonometric laws would be apparent including the law of cosines.

It is possible to then estimate the surface area of the anomaly. The estimation of the anomaly area will account for the perspective of the plane in the digital photo/thermal image. Direct field of view can be confirmed of the image using the laser measurement as an error detection tool. This approach could be more accurate compared to various AR measuring methods. By taking more than three measurements increased accuracy can be provided.

In this embodiment the measurement points can be seen on both the visual and thermal images. The measurements provide a reference and surface angle. Measurement input can be done manually or through automated link to an electronic device used.

In an embodiment the distances measured could be compared with the number of pixels in the digital photograph.

Figure 19B:
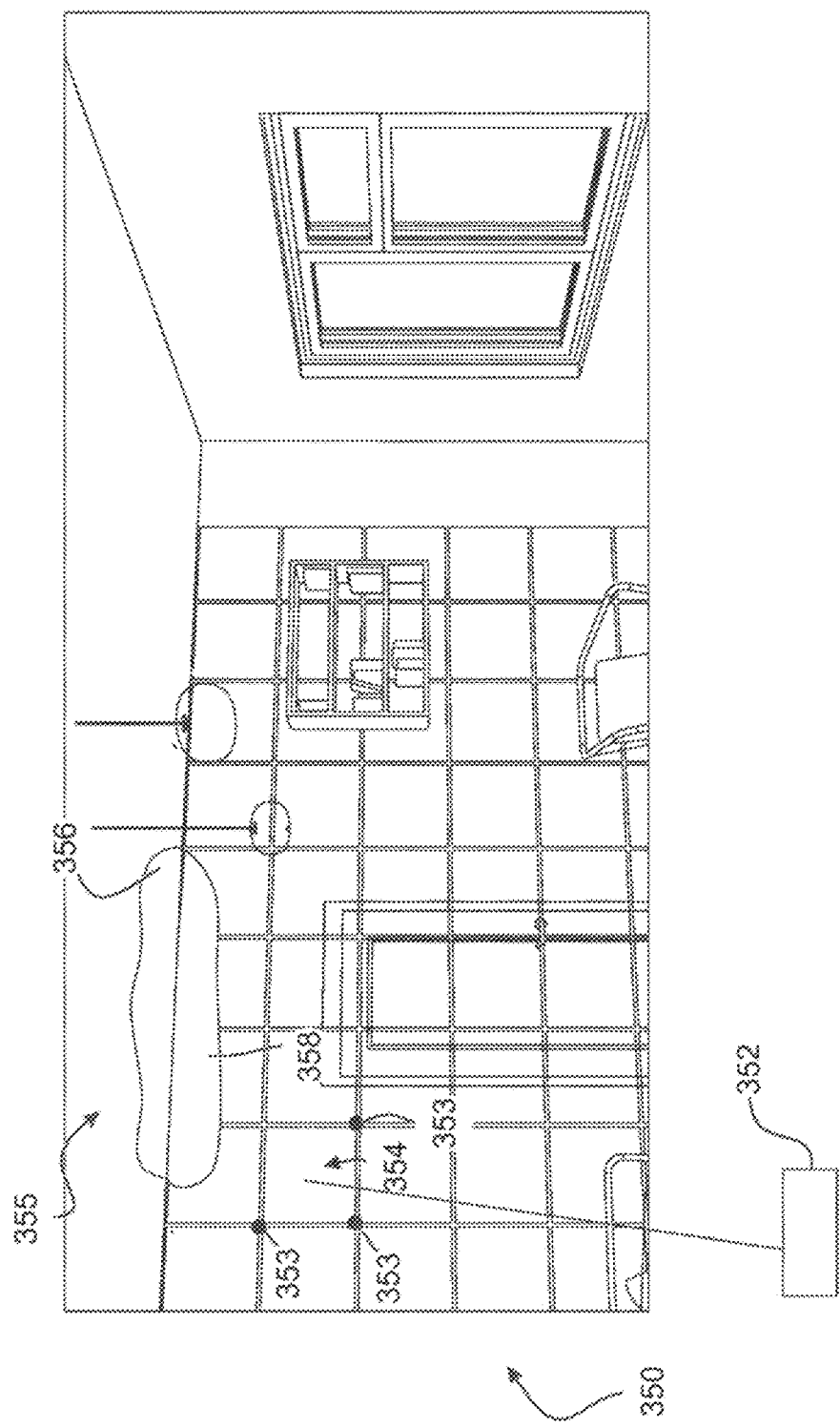

FIG. 19b illustrates a further approach according to an embodiment of the present invention. An operator uses a laser device 352 to project a number of laser dots 353 at location 354 in the vicinity of a thermal anomaly 355. The laser dots 352 are visually perceptible to the operator and are recorded by the operator in a visual image using a camera at the operator's location. The camera may form part of the laser device 352.

The operator records the visual image using the camera which captures three dots 353. The laser device 352 is used to record the distance to each of the three dots. The distances are stored with the visual image.

A thermal image is taken using a thermal camera from substantially the same view point. The operator identifies a thermal image area 358 using an area identification tool as commonly provided by image editing programs. The operate identifies thermal image area 358 and excludes thermal area 356. The thermal image and area selection information is stored for processing.

Processing includes estimating the surface area associated with thermal area 356 using the positioning of the laser dots 353 relative to the thermal area along with the respective distances to each of the three dots 353. Processing occurs in a remote system.

In one embodiment there is provided a device having: a projection arrangement for projecting an image onto a surface and determining at least three distances to the image from the projection arrangement. The projection arrangement includes a measurement system for taking at least three measurements relative to the image where the measurements are distance measurements. The projection arrangement includes three laser devices each configured to project a laser bean measuring the distance to the point at which the laser beam contacts the surface.

The device includes a thermal spectrum camera and the projection arrangement is configured to heat the surface to an extent necessary to allow a thermal spectrum camera to record the projected image on the surface. Laser devices have been found suitable in such an embodiment. The projected images allow estimation of inclination and position of the surface relative to the projection arrangement.

In one preferred embodiment, there is provided a computer implemented method comprising: making at least three distance measurements using a distance detector arrangement, with each measurement having a predetermined angular separation with respect to the other measurements. With the predetermined angular separations being known, it becomes possible to advantageously determine distances on the thermal image and estimate thermal surface areas from the thermal image. The method makes use of a preferred distance detector arrangement for making at least three distance measurements. The distance detector arrangement preferably comprises three laser distance measurement devices arranged so that each measurement has a predetermined angular separation with respect to the other measurements. An estimator is provided for estimating thermal surface areas from the thermal image.

Figure 20:
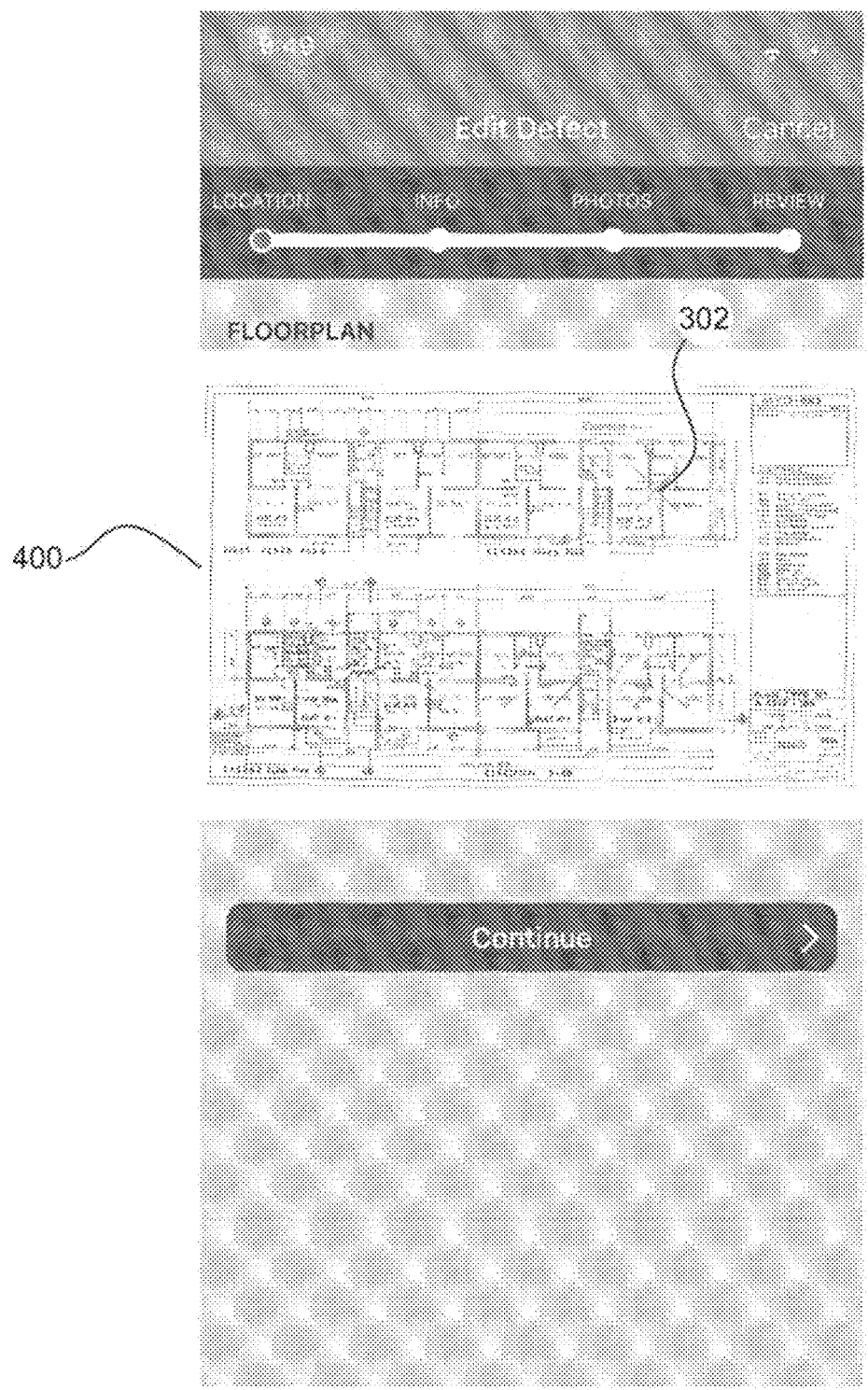
FIG. 20 provides a schematic view of a system according to another preferred embodiment.

Referring to FIG. 20, the system forms part of an overall thermal auditing system allowing the assessor to record thermal anomalies on a map 400. Various floor levels are loaded to provide the map. In the electronic device, the GPS and compass are used to position the assessor in the building and determine horizontal direction of the camera. The assessor specifies the floor level and the angle of the camera is determined automatically. A thermal anomaly 302 is located and added to the map 400. Data capture and overlaying advantageously proceeds as detailed above.

Figure 21:
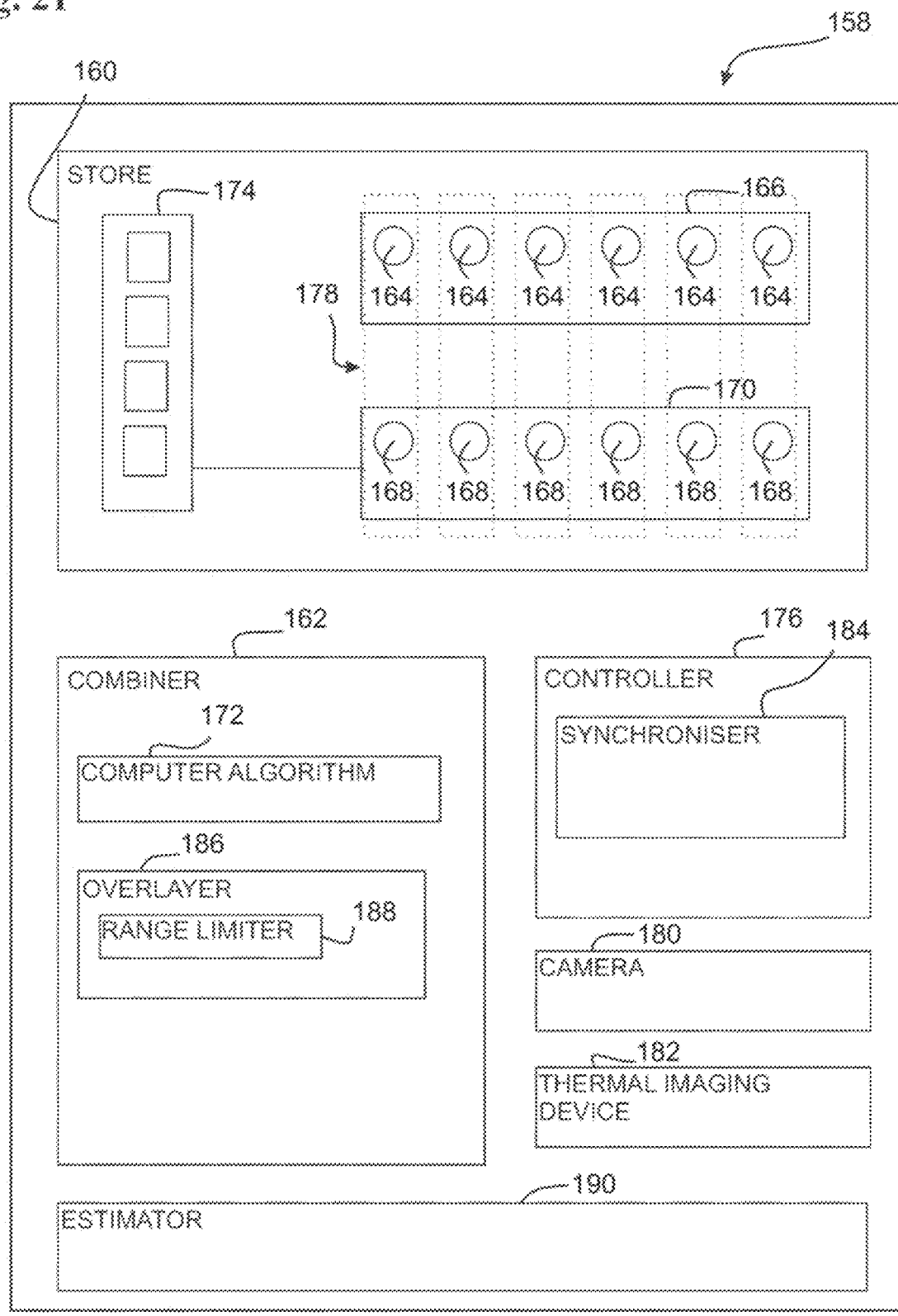
FIG. 21 provides a schematic view of a system according to another preferred embodiment.
Figure 22:
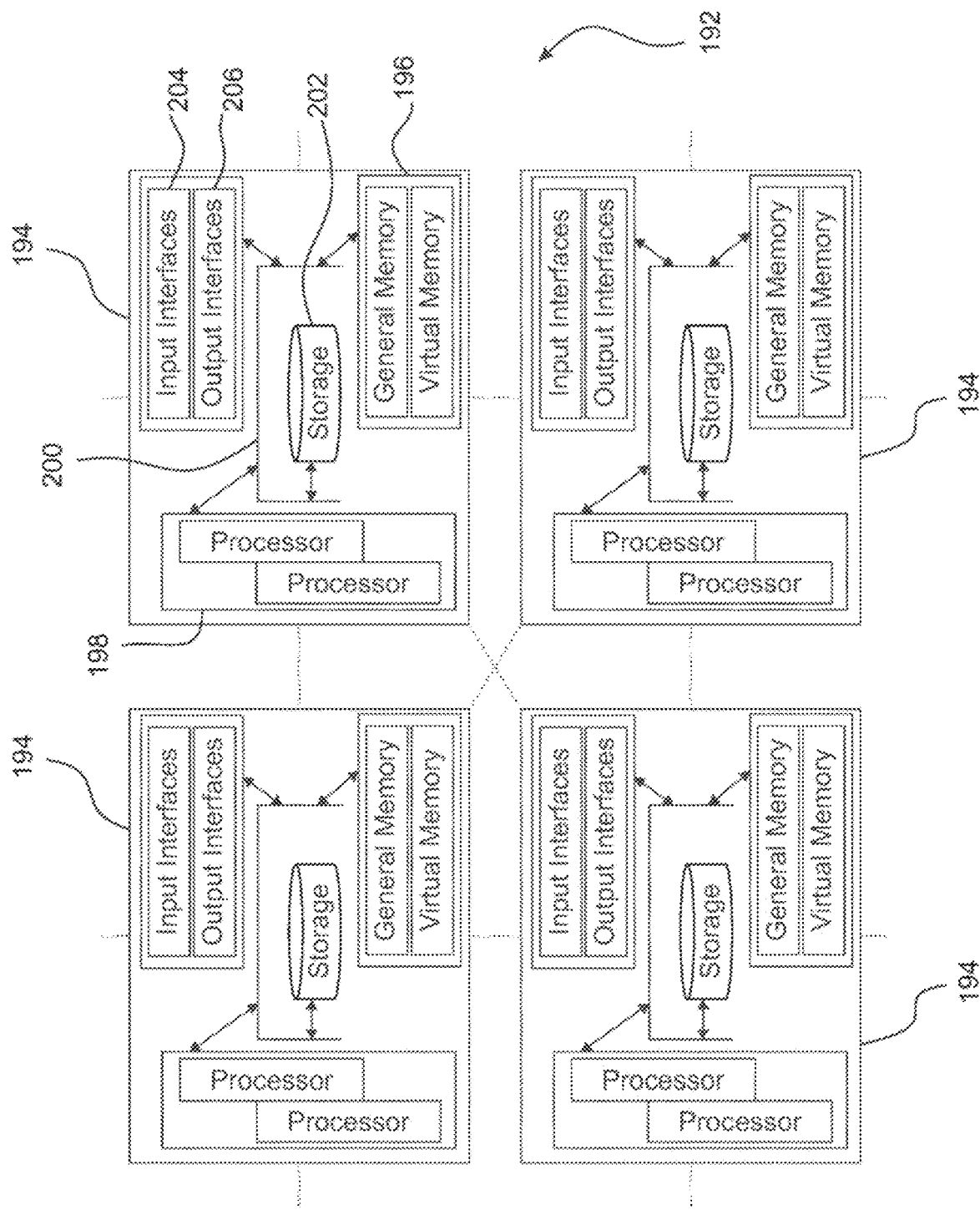
FIG. 22 provides an illustration of a system according to a further preferred embodiment of the present invention.

Referring to FIG. 21 there is shown a computer implemented structural thermal audit system 158 according to a further preferred embodiment of the present invention. The system 158 includes a store 160 and a combiner 162.

The store is configured to contain items 164 of photograph data 166 and items 168 of thermal image data 170. Each item 164 of photograph data 166 is of a structure such as a building from a viewpoint and is based on the visual spectrum as would be seen by the human eye. Each item 168 of thermal image data 170 is of a structure from a viewpoint and is based on the thermal spectrum as would be seen by a thermal imaging camera.

The combiner 162 is configured to utilise a computer algorithm 172 that identifies thermal areas of interest 174 in connection with the thermal image data rm to combine the areas of interest 174 with the photograph data 166.

The system 158 further includes a controller 176 that is configured to generate associated pairs 178 of the photograph data 166 and thermal image data 170 by controlling a camera 180 and a thermal imaging device 182 both forming part of the system 158.

With the use of the camera 178, the controller 176 is configured to collect an item 164 of photograph data 166 from a first viewpoint. By controlling the thermal imaging device 182, the controller is able to collect an item 168 of thermal image data 170 from a second viewpoint where the first viewpoint and the second viewpoint have the same direction and base location. In this embodiment the controller 176 includes a synchroniser 184 for synchronising the camera 178 and thermal imaging device 182 to assist with ensuring that the first viewpoint and the second viewpoint have substantially the same direction and base location. In this embodiment the items 164 of the photograph data 166 comprise photographs recording the visual spectrum as would be seen by the human eye. The items 168 of thermal image data 170 comprise images recording the thermal spectrum as is seen by the thermal imaging camera. Two different types of camera are accordingly used.

In this embodiment the synchroniser 184 is configured to synchronise the camera 180 and the thermal imaging device 182. to ensure that the photograph data 166 is collected almost instantaneously after the thermal image data 170 is collected. With the camera 180 and thermal imaging device 182 pointing in the same direction from the same base location, the visual photographs and thermal images can be readily referenced.

In this regard, the combiner 162 includes an over-layer 186 for overlaying the thermal areas of interest 174 on the photographs 164 to highlight and represent the thermal areas of interest in relation to the photographs 164. The thermal areas of interest 174 are determined using a range limiter 188 forming part of the system 158. The range limiter 188 is configured to specify a temperature range 188 that the combiner 162 uses to determine the thermal areas of interest 174. With the use of the range limiter 188 the combiner 162 is configured to combine the thermal areas of interest 174 with the photographs 164 only where the thermal image data 170 associated with the areas of interest 174 is within the temperature range specified by the range limiter 188.

The system 158 includes an estimator 190 that is configured to estimate the total surface area of the areas of interest 174. In this embodiment, the estimator 190 is configured to estimate the total surface area using distance data associated with the photograph data. By determining the distance to a point on the photograph and angles, determining size and perspective of the thermal areas of interest 174 becomes possible. In this embodiment this is achieved by the assessor specifying whether each area of interest is a horizontal ceiling or vertical wall and specifying the camera angle relative to vertical.

The embodiment is configured for angled surfaces including walls and ceilings with the angle being able to be specified.

The estimator 190 is configured to estimate the total surface area with the position data including direction data associated with the photograph data or thermal data. The mathematical geometry to determine surface area requires both a distance and angle information. For example, 30-degree angle will change the shape of an insulation bat (in a ceiling) extending directly away from the viewer. The total surface area can still be calculated by adjusting for the particular perspective. This embodiment assumes that the camera is aligned in the horizontal direction.

In various embodiments two dimensional thermal data is overlayed with visual spectrum based data and surface areas of the thermal data is estimated accounting for matters of perspective.

It is envisaged that some systems and methods will involve determining extent information with respect to thermal image data by applying thermal image data to a computer model of a structure.

In an embodiment, the computer model is generated by scanning of the structure using a visual spectrum camera modelling approach such as provided by various augmented reality systems. Other embodiments could of course use another approach such as laser scanning. Following this, thermal data images are taken and are subsequently mapped onto the 3d model. This is achieved by performing a feature mapping process of the thermal images on to the 3d model.

In one embodiment this is achieved by performing an edge transform to each thermal image as part of the feature mapping. The feature mapping applies a reconstruction of the thermal camera location and orientation in relation to the structure with respect to each thermal image. The thermal image data of each thermal image is then superimposed onto the 3d model.

In embodiments, the feature mapping reconstruction is performed by an online service that is remote from the thermal imaging camera. This preferably allows for increased processing speed as opposed to storing the 3d model on, and performing the processing local to, the thermal imaging camera. This would be another option. One advantage of the arrangement is that it is possible to use a thermal imaging camera that is not able to be connected to an augmented reality system.

In other embodiments distance laser reconstruction to determine sizing is performed by an online service.

In yet another embodiment, a visual spectrum photo is taken with position data being included in the visual spectrum photo. During an audit, a thermal image is captured. Subsequently, feature matching of thermal images is performed a number of days thereafter. The dimensions are worked out away from site using the data that was collected.

It will be appreciated that systems and methods according to embodiments of the present invention can estimate areas to provide a relatively reproducible percentage of coverage of insulation. In various embodiments this is achieved by using the thermal data to estimate the coverage of insulation on a ceiling or another surface. The systems and methods use the thermal areas of interest to estimate the surface areas covered by insulation and the surface areas that are not covered. Ceiling, wall and floor insulation areas can be estimated.

Another advantage of various embodiments is that it is possible for an assessor to articulate exact locations, with detailed visual representation, to enable an economic remediation solution. As such, an assessor can quickly identify and record thermal areas of interest using a mobile application.

Referring to FIG. 21 there is shown a schematic diagram of a computer system 192 that is configured to provide preferred arrangements of systems and methods described herein. The computer system 192 is provided as a distributed computer environment containing a number of individual computer systems 194 (computers/computing devices) that cooperate to provide the preferred arrangements. In other embodiments the computer system 192 is provided as a single computing device.

As shown, a first one of the computing devices 194 includes a memory facility 196. The memory facility 196 includes both 'general memory' and other forms of memory such as virtual memory. The memory facility 196 is operatively connected to a processing facility 198 including at least one processor. The memory facility 196 includes computer information in the form of executable instructions and/or computer data. The memory facility 196 is accessible by the processing facility 198 in implementing the preferred arrangements.

As shown, each of the computing devices 194 includes a system bus facility 200, a data store facility 202, an input interface facility 204 and an output interface facility 206. The data store facility 202 includes computer information in form of executable instructions and/or computer data. The data store facility 202 is operatively connected to the processing facility 198. The data store facility 202 is operatively connected to the memory facility 196. The data store facility 202 is accessible by the processing facility 198 in implementing the preferred arrangements.

Computer information may be located across a number of devices and be provided in a number of forms. For example, the data store facility 202 may include computer information in the form of executable instructions and/or computer data. The computer data information may be provided in the form of encoded data instructions, data signals, data structures, program logic for server side operation, program logic for client side operation, stored webpages and so forth that are accessible by the processing facility 198.

On one level, input interfaces allow computer data to be received by the computing devices 194. On another level, input interfaces allow computer data to be received from individuals operating one or more computer devices. Output interfaces, on one level, allow for instructions to be sent to computing devices. On another level, output interfaces allow computer data to be sent to individuals. The input and output interface facilities 204, 206 provide input and output interfaces that are operatively associated with the processing facility 198. The input and output facilities 204, 206 allow for communication between the computing devices 194 and individuals.

The computing devices 194 provide a distributed system in which several devices are in communication over network and other interfaces to collectively provide the preferred arrangements. Preferably there is provided at least one client device in the system of computing devices 194 where the system is interconnected by a data network.

The client device may be provided with a client side software product for use in the system which, when used, provides systems and methods where the client device and other computer devices 194 communicate over a public data network. Preferably the software product contains computer information in the form of executable instructions and/or computer data for providing the preferred arrangements.

Input interfaces associated with keyboards, mice, trackballs, touchpad's, scanners, video cards, audio cards, network cards and the like are known. Output interfaces associated with monitors, printers, speakers, facsimiles, projectors and the like are known. Network interfaces in the form of wired or wireless interfaces for various forms of LANs, WANs and so forth are known. Storage facilities in the form of floppy disks, hard disks, disk cartridges, CD-ROMS, smart card, RAID systems are known. Volatile and non-volatile memory types including RAM, ROM, EEPROM and other data storage types are known. Various transmission facilities such as circuit board material, coaxial cable, fibre optics, wireless facilities and so forth are known.

It is to be appreciated that systems, components, facilities, interfaces and so forth can be provided in several forms. Systems, components, facilities, interfaces and so forth may be provided as hardware, software or a combination thereof. The present invention may be embodied as an electronics device, computer readable memory, a personal computer and distributed computing environments.

In addition the present invention may be embodied as: a number of computer executable operations; a number of computer executable components; a set of process operations; a set of systems, facilities or components; a computer readable medium having stored thereon computer executable instructions for performing computer implemented methods and/or providing computer implemented systems; and so forth. In the case of computer executable instructions, they preferably encode the systems, components and facilities described herein. For example, a computer-readable medium may be encoded with one or more facilities configured to run an application configured to carry out a number of operations forming at least part of the present arrangements. Computer readable mediums preferably participate in the provision of computer executable instructions to one or more processors of one or more computing devices.

Computer executable instructions are preferably executed by one or more computing devices to cause the one or more computing devices to operate as desired. Preferred data structures are preferably stored on a computer readable medium. The computer executable instructions may form part of an operating system of a computer device for performing at least part of the preferred arrangements. One or more computing devices may preferably implement the preferred arrangements.

The term computer is to be understood as including all forms of computing device including servers, personal computers, smart phones, digital assistants, electronics devices and distributed computing systems.

Computer readable mediums and so forth of the type envisaged are preferably intransient. Such computer readable mediums may be operatively associated with computer based transmission facilities for the transfer of computer data. Computer readable mediums may provide data signals. Computer readable mediums preferably include magnetic disks, optical disks and other electric/magnetic and physical storage mediums as may have or find application in the industry.

Components, systems and tasks may comprise a process involving the provision of executable instructions to perform a process or the execution of executable instructions within say a processor. Applications or other executable instructions may perform method operations in different orders to achieve similar results. It is to be appreciated that the blocks of systems and methods described may be embodied in any suitable arrangement and in any suited order of operation. Computing facilities, modules, interfaces and the like may be provided in distinct, separate, joined, nested or other forms and arrangements. Methods will be apparent from systems described herein and systems will be apparent from methods described herein.

As would be apparent, various alterations and equivalent forms may be provided without departing from the spirit and scope of the present invention. This includes modifications within the scope of the appended claims along with all modifications, alternative constructions and equivalents.

There is no intention to limit the present invention to the specific embodiments shown in the drawings. The present invention is to be construed beneficially to the applicant and the invention given its full scope.

In the present specification, the presence of particular features does not preclude the existence of further features. The words 'comprising', 'including', 'or' and 'having' are to be construed in an inclusive rather than an exclusive sense.

It is to be recognised that any discussion in the present specification is intended to explain the context of the present invention. It is not to be taken as an admission that the material discussed formed part of the prior art base or relevant general knowledge in any particular country or region.

What is claimed is:

1. A computer implemented thermal audit method comprising:

using items of photograph data, each item of photograph data being of a viewpoint of a part of a structure having one or more possible thermal areas of interest the viewpoint being different from a viewpoint of any other item of photograph data of the part of the structure, wherein each item of photograph data is based on a visual spectrum as would be seen by the human eye;

using items of thermal image data, each item of thermal data being of the part of the structure from a viewpoint of the part of the structure different from a viewpoint of any other viewpoint of each other item of thermal image data of the part of the structure, wherein each item of thermal image data is based on a thermal spectrum as would be seen by a thermal imaging camera; and applying a computer algorithm that identifies one or more thermal areas of interest in connection with the thermal image data and combines the one or more thermal areas of interest of the part of the structure from at least two different viewpoints of the part of the structure with the photograph data of the part of the structure from at least two different viewpoints corresponding to the at least two different viewpoints of the thermal areas of interest of the part of the structure to provide a single augmented reality image of the part of the structure.

2. The computer implemented thermal audit method as claimed in claim 1 further comprising generating associated pairs of photograph data items and thermal image data items by repeatedly: (a) collecting an item of photograph data from a first viewpoint using a camera; and collecting an item of thermal image data from a second viewpoint using a thermal imaging device wherein the first viewpoint and the second viewpoint have substantially the same direction and base location; and (b) changing the first viewpoint.

3. The computer implemented thermal audit method as claimed in claim 2 further comprising synchronising the camera and thermal imaging device to assist with ensuring that the first viewpoint and the second viewpoint of each pair have the substantially the same direction and base location.

4. The computer implemented thermal audit method as claimed in claim 1 wherein combining the one or more thermal areas of interest, in connection with the thermal image data, with the photograph data comprises overlaying the one or more thermal areas of interest on the photograph data to highlight and represent the one or more thermal areas of interest in relation to the photograph data.

5. The computer implemented thermal audit method as claimed in claim 1 further comprising combining the one or more thermal areas of interest with the photograph data only where the thermal image data associated with the one or more thermal areas of interest is within a temperature range.

6. The computer implemented thermal audit method as claimed in claim 1 further comprising estimating the total surface area of the one or more thermal areas of interest.

7. The computer implemented thermal audit method as claimed in claim 6 wherein estimating the total surface area comprises using position data associated with the photograph data or thermal data.

8. The computer implemented thermal audit method as claimed in claim 7 wherein the position data comprises direction data associated with the photograph data or thermal data.

9. The computer implemented thermal audit method as claimed in claim 8 wherein the position data comprises distance data associated with the photograph data or thermal data.

10. A computer implemented thermal audit system comprising:
a storage device for containing items of photograph data and items of thermal image data, each item of photograph data being of a part of a structure having one or more possible thermal areas of interest from a viewpoint of the part of the structure being different from a viewpoint of any other item of photograph data of the part of the structure, wherein each item of photograph data is based on a visual spectrum as would be seen by the human eye, each item of thermal image data being of a part of the structure from a viewpoint of the part of the structure being different from a viewpoint of any other item of thermal image data of the part of the structure, wherein each item of thermal image data is based on a thermal spectrum as would be seen by a thermal imaging camera; and
a combiner for utilising a computer algorithm that identifies one or more thermal areas of interest of the part of the structure in connection with the thermal image data and combines the one or more areas of interest of the part of the structure from at least two different viewpoints of the part of the structure with the photograph data from at least two different viewpoints corresponding to the at least two different viewpoints of the thermal areas of interest of the part of the structure to provide a single augmented reality image of the part of the structure.

11. The computer implemented thermal audit system as claimed in claim 10 further comprising a controller for generating associated pairs of the photograph data and thermal image data by controlling a camera to collect an item of the photograph data from a first viewpoint and for controlling a thermal imaging device to collect an item of thermal image data from a second viewpoint wherein the first viewpoint and the second viewpoint have substantially the same direction and base location.

12. The computer implemented thermal audit system as claimed in claim 11 wherein the controller comprises a synchroniser for synchronising the camera and the thermal imaging device to assist with ensuring that the first viewpoint and the second viewpoint of a pair have the same direction and base location.

13. The computer implemented thermal audit system as claimed in claim 12 wherein the synchroniser is configured to synchronise the camera and thermal imaging device to ensure that the photograph data of a pair is collected within less than 1 or 2 seconds before or after the thermal image data of the pair is collected.

14. The computer implemented thermal audit system as claimed in claim 10 wherein the combiner comprises an over-layer for overlaying the one or more thermal areas of interest on the photograph data to highlight and represent the one or more thermal areas of interest in relation to the photograph data.

15. The computer implemented thermal audit system as claimed in claim 10 further comprising a range limiter for specifying a temperature range; the combiner being configured to combine the one or more thermal areas of interest with the photograph data only where the thermal image data associated with the one or more thermal areas of interest is within the temperature range specified by the range limiter.

16. The computer implemented thermal audit system as claimed in claim 10 further comprising an estimator configured to estimate the total surface area of the one or more thermal areas of interest.

17. The computer implemented thermal audit system as claimed in claim 16 wherein the estimator is configured to estimate the total surface area using position data associated with the photograph data or thermal data.

18. The computer implemented thermal audit system as claimed in claim 17 wherein the estimator is configured to estimate the total surface area with the position data comprising direction data associated with the photograph data or thermal data.

19. The computer implemented thermal audit system as claimed in claim 18 wherein the estimator is configured to estimate the total surface area with the position data comprising direction distance data associated with the photograph data or thermal data.

20. The computer implemented thermal audit method as claimed in claim 19 wherein the position data includes distance data associated with the photograph data or thermal data.

* * * * *